(12) United States Patent
Hanaoka et al.

(10) Patent No.: US 11,646,612 B2
(45) Date of Patent: May 9, 2023

(54) STATOR HAVING SEGMENT CONDUCTORS WITH PHASE WINDINGS HAVING PARALLEL CONDUCTORS CONNECTED IN SERIES

(71) Applicant: SUBARU CORPORATION, Tokyo (JP)

(72) Inventors: Masatoshi Hanaoka, Tokyo (JP); Nobuhiko Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 50 days.

(21) Appl. No.: 17/379,081

(22) Filed: Jul. 19, 2021

(65) Prior Publication Data

US 2022/0077728 A1    Mar. 10, 2022

(30) Foreign Application Priority Data

Sep. 4, 2020    (JP) ............... JP2020-148832

(51) Int. Cl.
*H02K 1/16* (2006.01)
*H02K 3/48* (2006.01)
(Continued)

(52) U.S. Cl.
CPC ........... *H02K 1/165* (2013.01); *H02K 3/14* (2013.01); *H02K 3/28* (2013.01); *H02K 3/48* (2013.01)

(58) Field of Classification Search
CPC ............ H02K 1/16; H02K 1/165; H02K 3/14; H02K 3/28; H02K 3/48
(Continued)

(56) References Cited

U.S. PATENT DOCUMENTS

2009/0096313 A1* 4/2009 Harada .................. H02K 3/522
977/932
2010/0289374 A1* 11/2010 Koga ................. H02K 15/0421
310/195

(Continued)

FOREIGN PATENT DOCUMENTS

| JP | 2007-228708 A | 9/2007 |
| JP | 2007-267570 A | 10/2007 |
| JP | 2012-130093 A | 7/2012 |

*Primary Examiner* — Rashad H Johnson
(74) *Attorney, Agent, or Firm* — McGinn I.P. Law Group, PLLC.

(57) ABSTRACT

A stator for a rotary electric machine includes a stator core with slots and a stator winding. The stator winding includes a phase winding including segment conductors inserted in the slots. The phase winding includes parallel conductors connected in series. Each of the parallel conductors includes segment conductors connected in parallel. When one parallel conductor is regarded as a reference parallel conductor, and the segment conductors constituting the reference parallel conductor are regarded as reference segment conductors, each reference segment conductor includes a first conductor portion constituting a first conductor portion group, and a second conductor portion constituting a second conductor portion group. One reference segment conductor includes an outer conductor portion, as the first conductor portion, located on the outermost position in the first conductor portion group, and an inner conductor portion, as the second conductor portion, located on the innermost position in the second conductor portion group.

12 Claims, 16 Drawing Sheets

(51) Int. Cl.
*H02K 3/28* (2006.01)
*H02K 3/14* (2006.01)

(58) Field of Classification Search
USPC .......................................... 310/179, 181, 184
See application file for complete search history.

(56) References Cited

U.S. PATENT DOCUMENTS

| | | |
|---|---|---|
| 2012/0146447 A1 | 6/2012 | Seguchi et al. |
| 2016/0056679 A1* | 2/2016 | Sakaue .................... H02K 3/34 310/198 |
| 2016/0336826 A1* | 11/2016 | Ichikawa ................. H02K 1/16 |
| 2018/0034332 A1* | 2/2018 | Takahashi ............. H02K 1/243 |
| 2021/0099039 A1* | 4/2021 | Hanaoka ................. H02K 3/28 |
| 2021/0218306 A1* | 7/2021 | Fukunaga ............... H02K 1/16 |
| 2021/0359562 A1* | 11/2021 | Katsu ...................... H02K 1/16 |
| 2021/0408856 A1* | 12/2021 | Fukunaga ............... H02K 3/50 |
| 2022/0037945 A1* | 2/2022 | Koshiba .................. H02K 3/28 |
| 2022/0052586 A1* | 2/2022 | Nagase ................. H02K 3/522 |
| 2022/0077728 A1* | 3/2022 | Hanaoka ................. H02K 3/48 |
| 2022/0085681 A1* | 3/2022 | Kojima ................. H02K 3/505 |
| 2022/0255386 A1* | 8/2022 | Hijikata ................. H02K 3/12 |
| 2022/0294299 A1* | 9/2022 | Hisada ................... H02K 3/48 |

* cited by examiner

FIG. 10
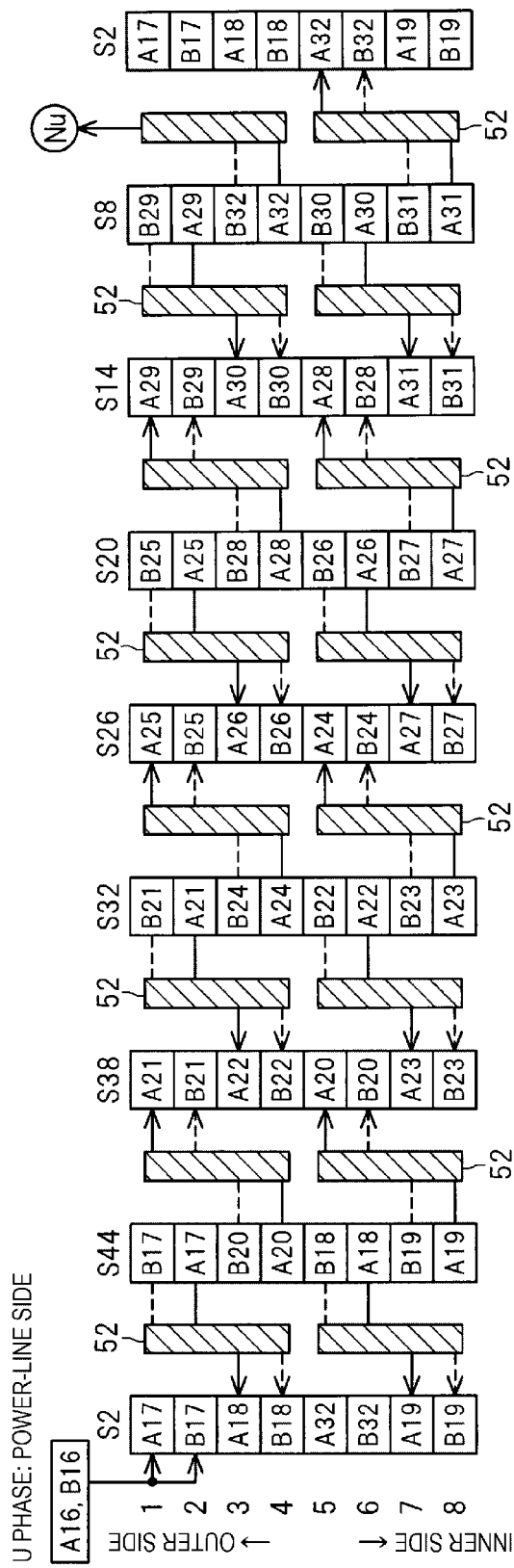
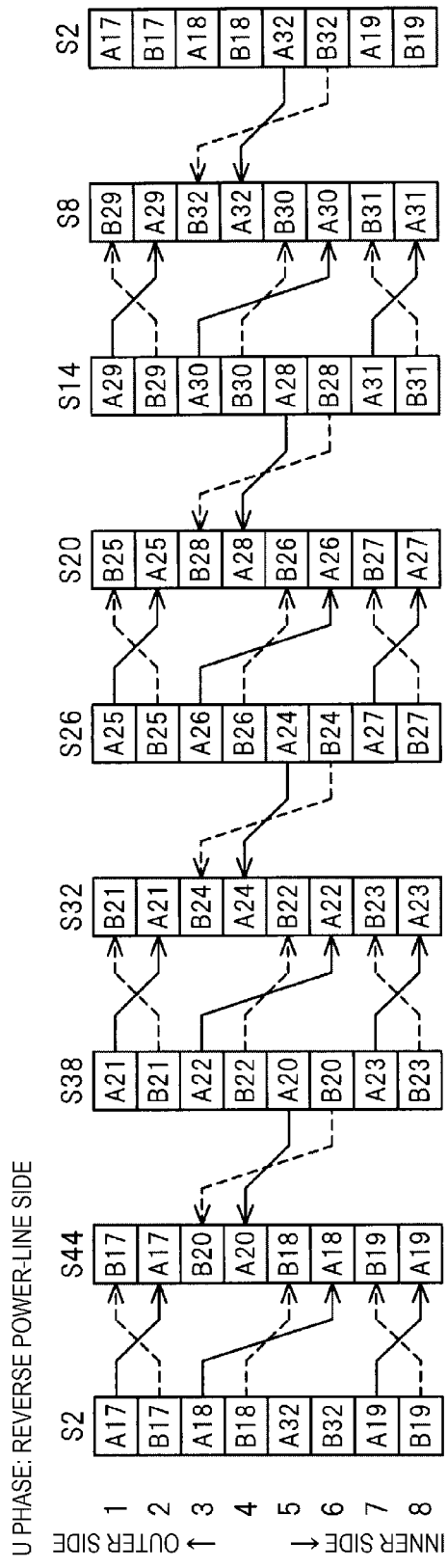

FIG. 11
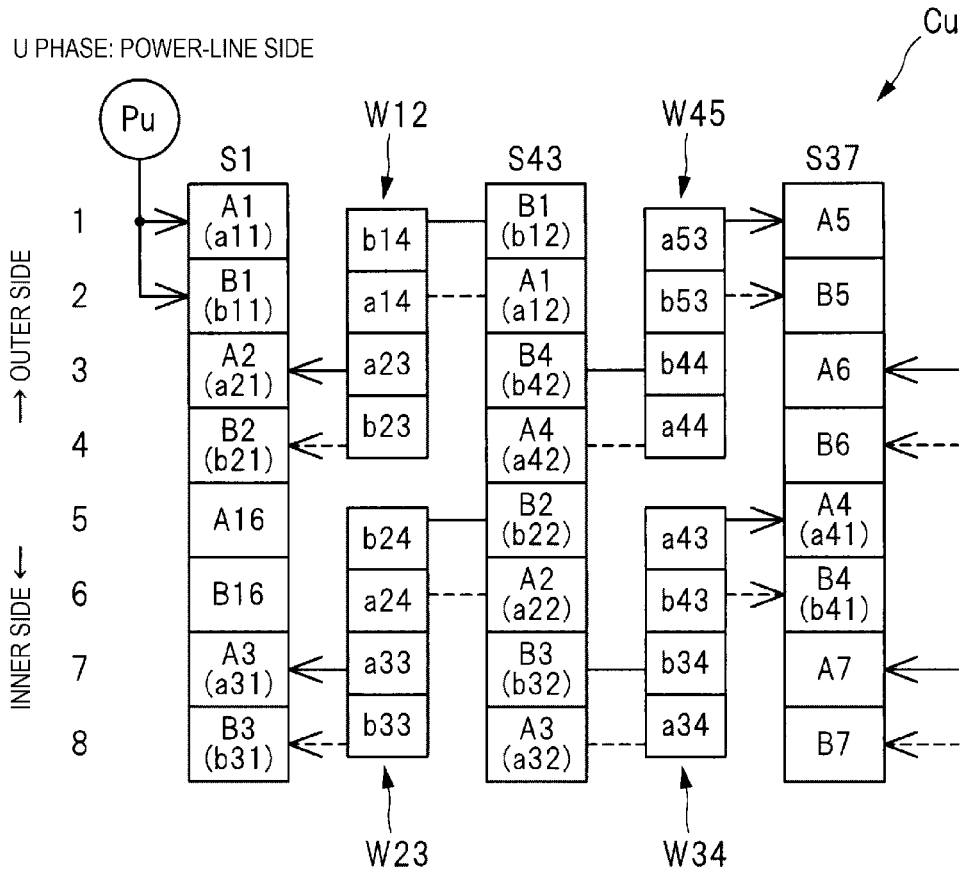
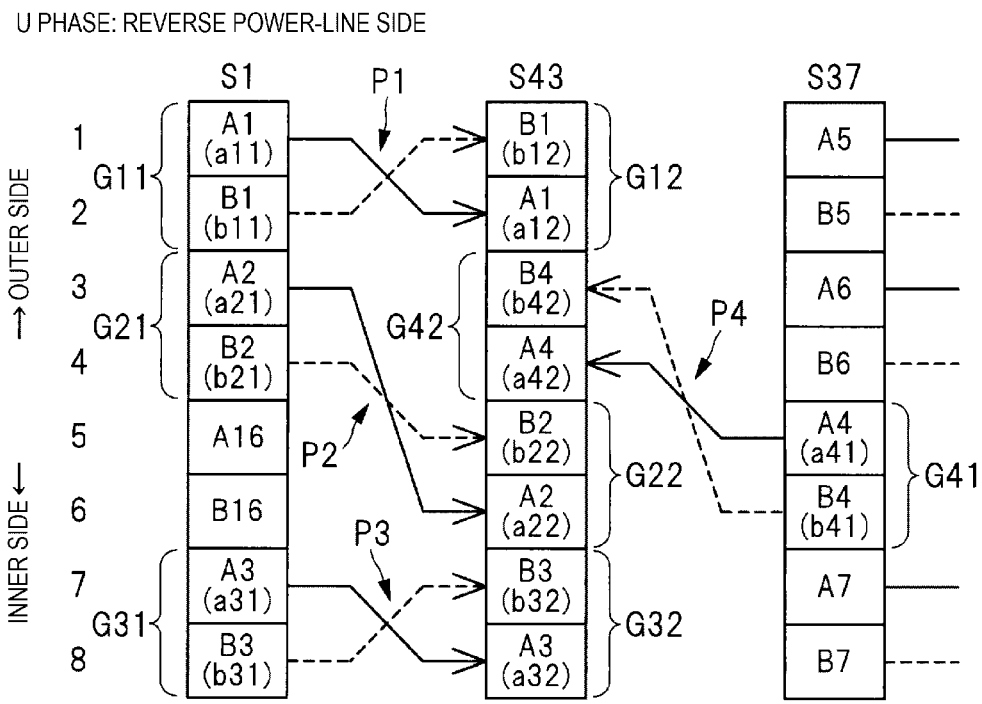

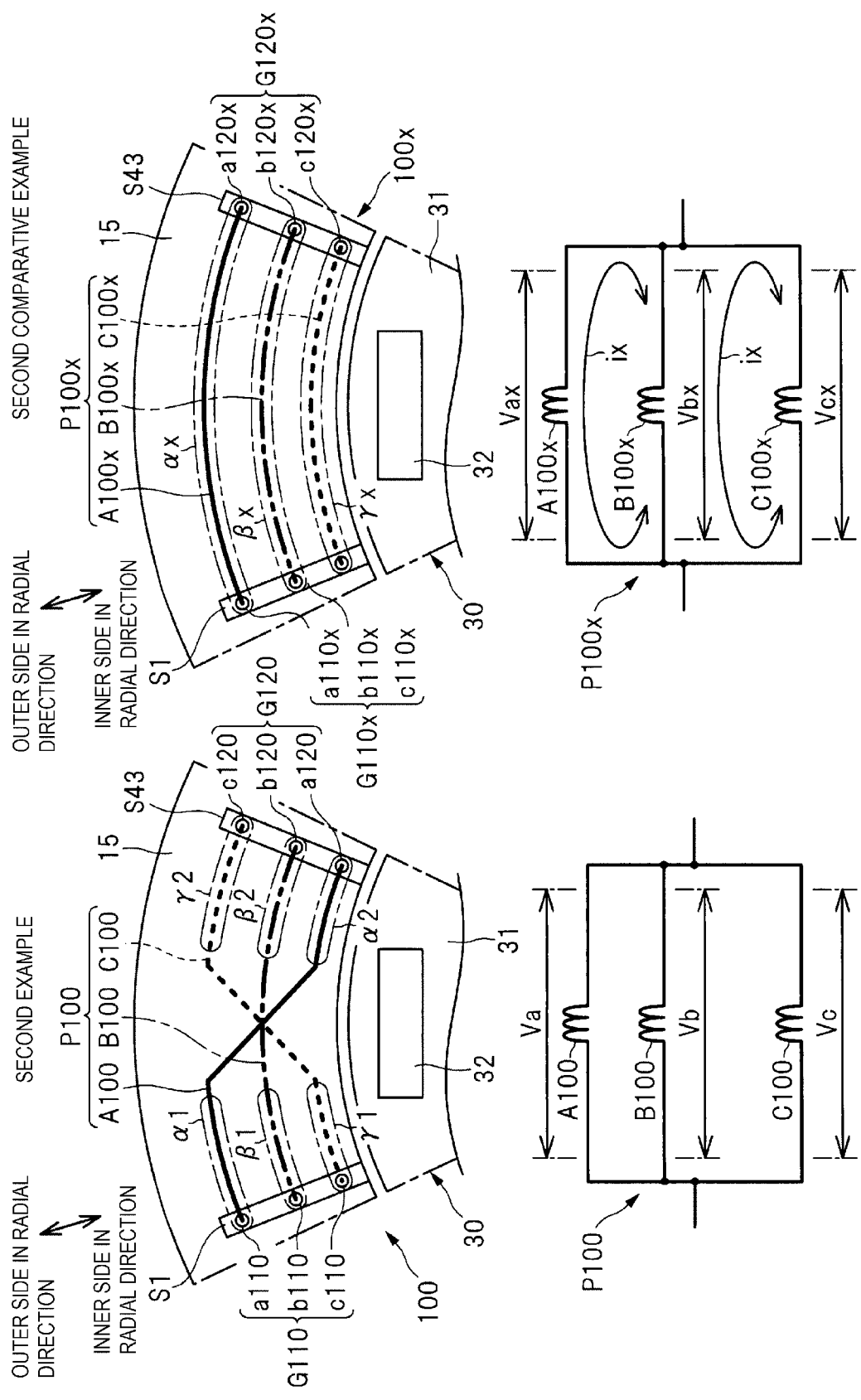

STATOR HAVING SEGMENT CONDUCTORS WITH PHASE WINDINGS HAVING PARALLEL CONDUCTORS CONNECTED IN SERIES

CROSS-REFERENCE TO RELATED APPLICATIONS

The present application claims priority from Japanese Patent Application No. 2020-148832 filed on Sep. 4, 2020, the entire contents of which are hereby incorporated by reference.

BACKGROUND

The disclosure relates to a stator of a rotary electric machine.

A rotary electric machine, such as an electric motor and a generator, is provided with a stator including a stator core and a stator coil. As the stator coil wound on the stator core, there have been proposed stator coils including plural segment coils bent substantially in a U shape (see Japanese Unexamined Patent Application Publication (JP-A) No. 2012-130093, JP-A No. 2007-228708, and JP-A No. 2007-267570).

SUMMARY

An aspect of the disclosure provides a stator for a rotary electric machine including a stator core and a stator winding. The stator core has a hollow cylindrical shape. The stator core includes slots. The stator winding includes a phase winding. The phase winding includes segment conductors inserted in the slots. The phase winding includes parallel conductors connected to one another in series. Each of the parallel conductors includes ones of the segment conductors connected to one another in parallel. When one of the parallel conductors is regarded as a reference parallel conductor, and when the segment conductors that constitute the reference parallel conductor are regarded as reference segment conductors, the reference segment conductors include respective first conductor portions and respective second conductor portions. Each of the respective first conductor portions is held in a first slot of the of slots and constitutes a first conductor portion group. Each of the respective second conductor portions is held in a second slot of the slots and constitutes a second conductor portion group. One of the reference segment conductors includes an outer conductor portion as a corresponding one of the respective first conductor portions and an inner conductor portion, as a corresponding one of the respective second conductor portions. The outer conductor portion is located on an outermost position in a radial direction in the first conductor portion group. The inner conductor portion is located on an innermost position in the radial direction in the second conductor portion group.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 10 is a diagram illustrating holding positions of the segment coils that constitute the U-phase coil with respect to the slots.

FIG. 11 is an enlarged view of a range α in FIG. 9.

FIG. 16A is a simplified partial view of a stator as a second example, illustrating induction voltages generated in a parallel coil.

FIG. 16B is a simplified partial view of a stator as a second comparative example, illustrating induction voltages generated in a parallel coil.

DETAILED DESCRIPTION

In order to enhance energy efficiency of a rotary electric machine, there is a demand for eliminating or reducing a circulating current of a stator coil. In view of this, it is considered that segment coils held in a common slot are connected to each other in parallel so as to decrease a potential difference between the segment coils. However, even in the case of connecting the segment coils in parallel, some arrangement of the segment coils causes a slight potential difference between the segment coils. Consequently, there is a demand for reducing the potential difference between the segment coils so as to eliminate or reduce the circulating current of the stator coil, which is a stator winding.

It is desirable to eliminate or reduce a circulating current of a stator winding.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, as an exemplary rotary electric machine 11 including a stator 10 according to an embodiment of the disclosure, a three-phase alternating current synchronous motor-generator mounted on an electric vehicle, a hybrid vehicle, and other vehicles will be given. However, this is not to be construed in a limiting sense. Any rotary electric machine may be applied insofar as the rotary electric machine includes the stator 10 where segment coils 40 are assembled.

Configuration of Rotary Electric Machine

Figure 1:
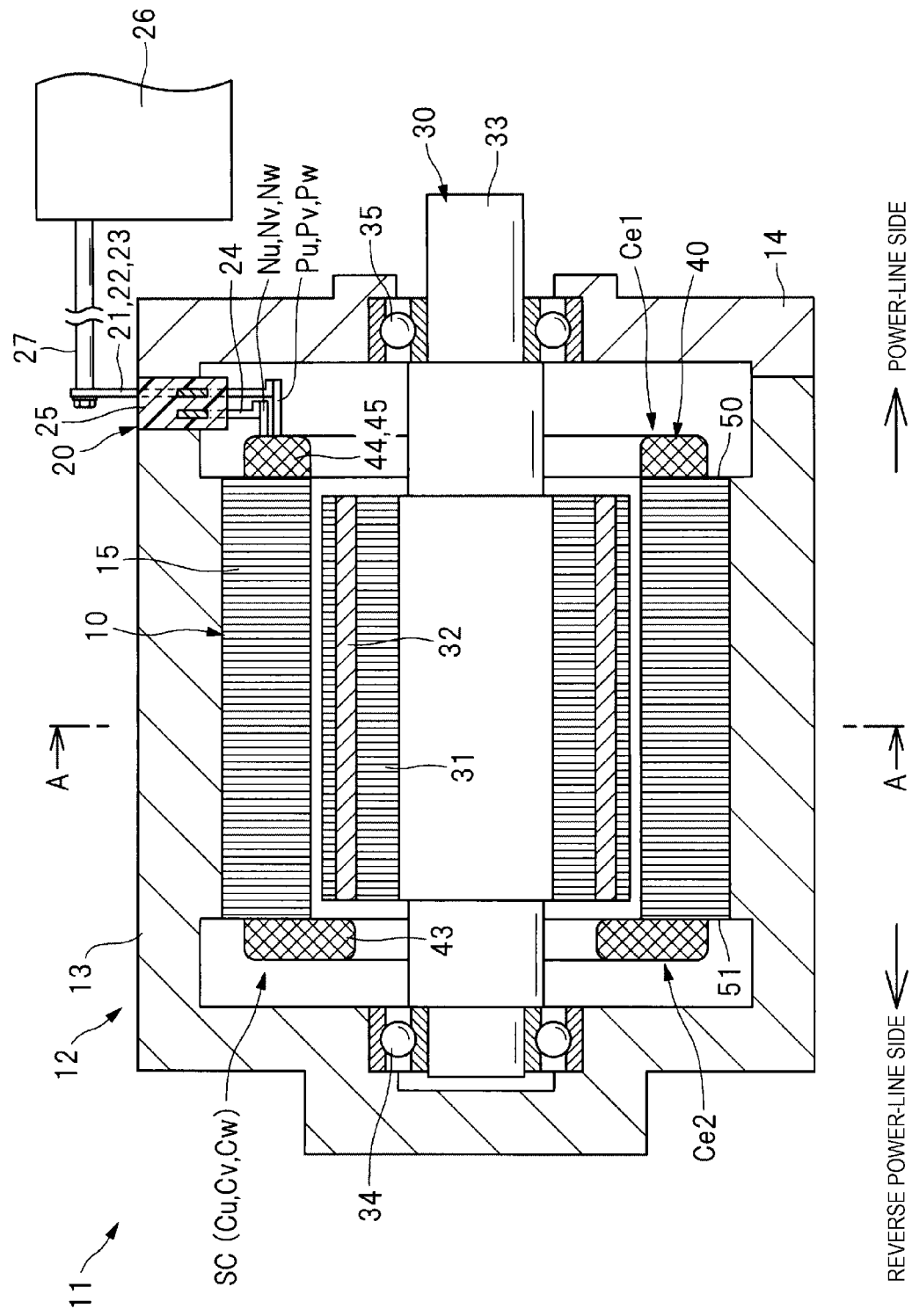
FIG. 1 is a cross-sectional view of an example of a rotary electric machine including a stator according to an embodiment of the disclosure.

FIG. 1 is a cross-sectional view of an example of the rotary electric machine 11 including the stator 10 according to the embodiment of the disclosure. As illustrated in FIG. 1, the rotary electric machine 11 is a motor-generator and includes a motor housing 12. The motor housing 12 includes a housing body 13 of a bottomed, hollow cylindrical shape, and an end cover 14 that closes an open end of the housing body 13. The stator 10 is secured in the housing body 13 and includes a stator core 15 of a hollow cylindrical shape including plural silicon steel sheets, for example, and a three-phase stator coil SC wound on the stator core 15. In one embodiment, the stator coil SC may serve as a "stator winding".

A bus bar unit 20 is coupled to the stator coil SC. This bus bar unit 20 includes three power bus bars 21 to 23 coupled to three power points Pu, Pv, and Pw of the stator coil SC, a neutral bus bar 24 that couples three neutral points Nu, Nv, and Nw of the stator coil SC to one another, and an insulating member 25 to hold these bus bars 21 to 24. End portions of the power bus bars 21 to 23 protrude outward from the motor housing 12, and a power cable 27 extending from an inverter 26, for example, is coupled to each of the power bus bars 21 to 23.

A rotor 30 of a solid cylindrical shape is rotatably accommodated in a center of the stator core 15. This rotor 30 includes a rotor core 31 of a hollow cylindrical shape including plural silicon steel sheets, for example, plural permanent magnets 32 buried in the rotor core 31, and a rotor shaft 33 secured in a center of the rotor core 31. One end of the rotor shaft 33 is supported by a bearing 34 disposed on the housing body 13, and the other end of the rotor shaft 33 is supported by a bearing 35 disposed on the end cover 14.

Configuration of Stator

Figure 2:
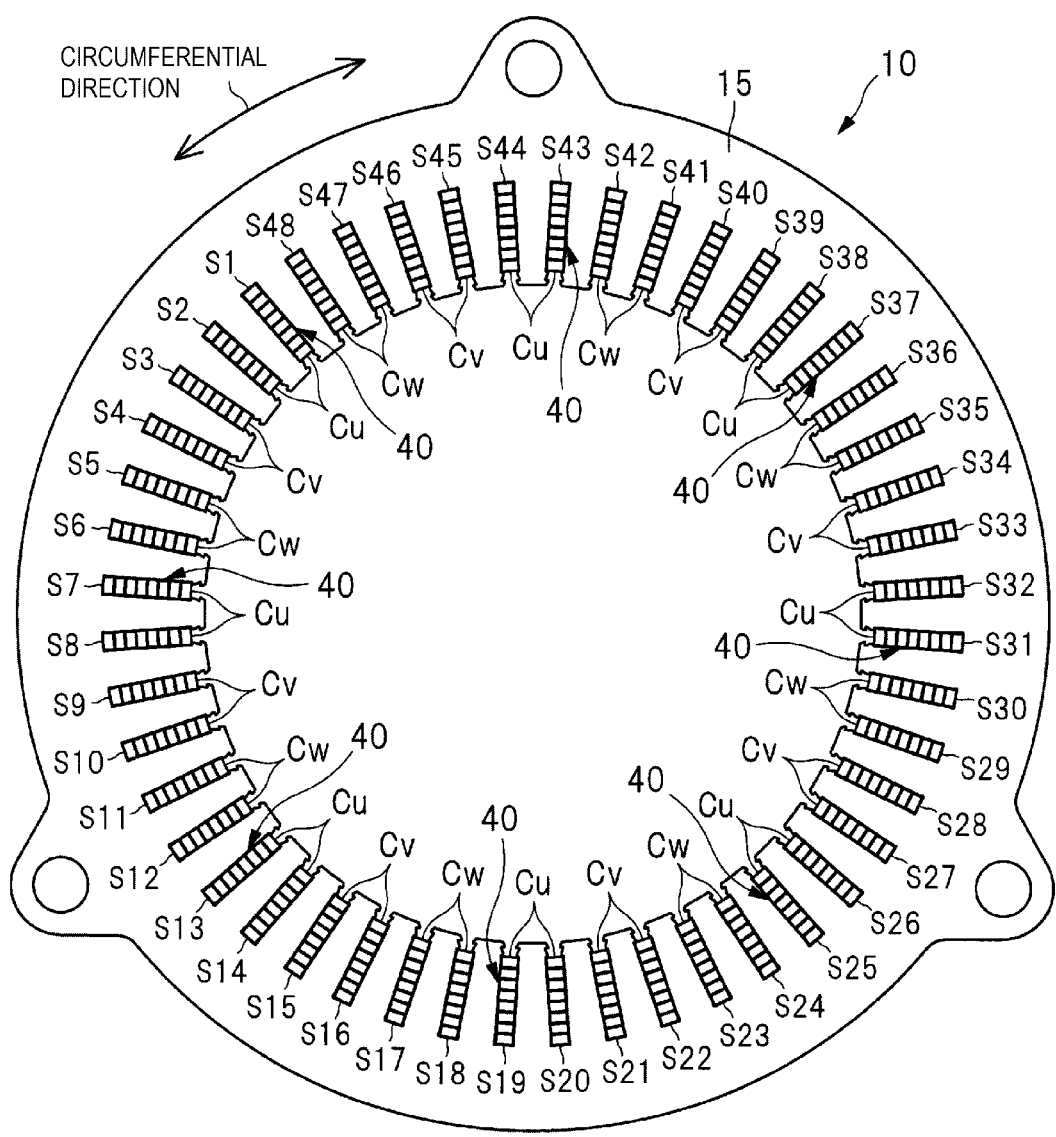
FIG. 2 is a cross-sectional view of the stator taken along line A-A in FIG. 1.
Figure 3:
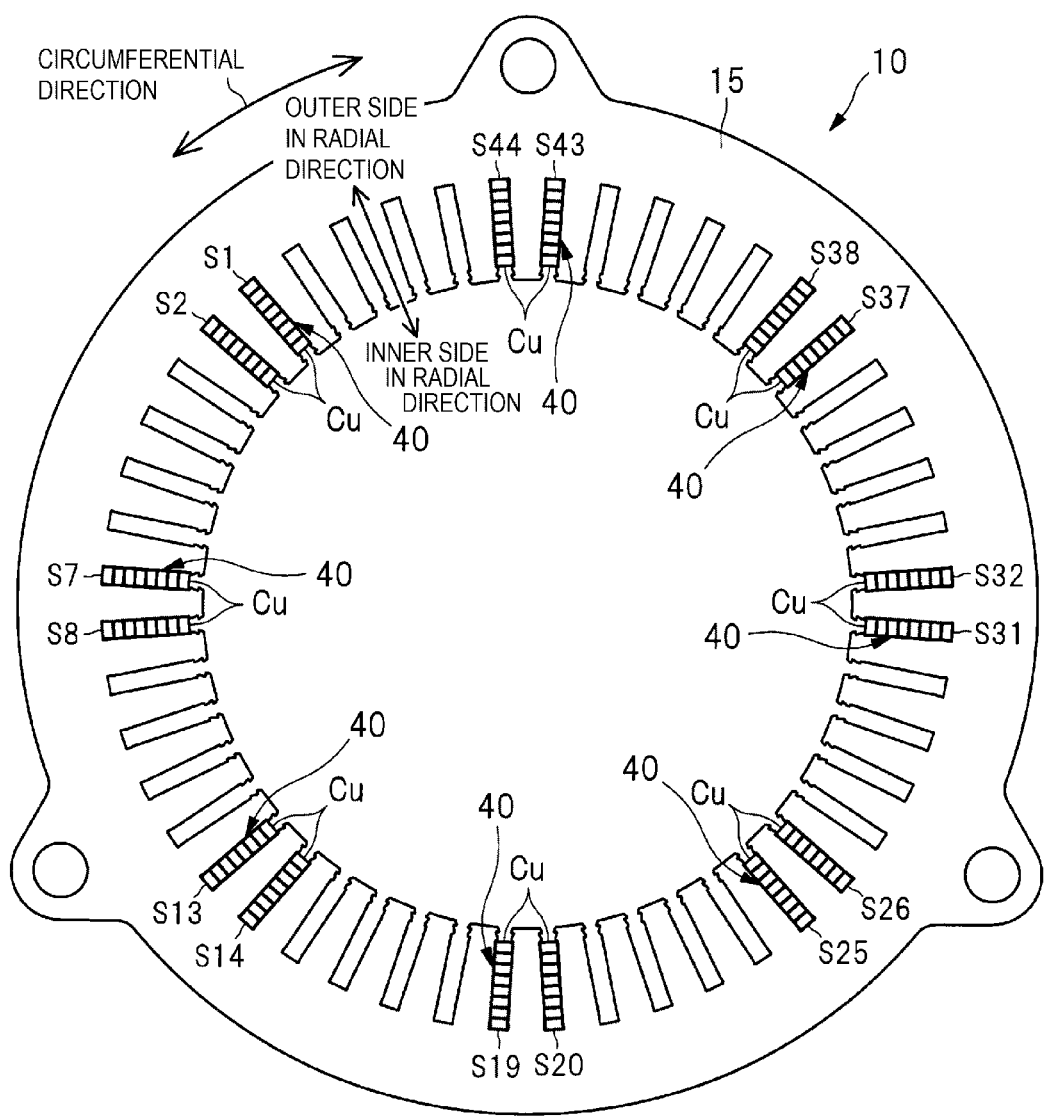
FIG. 3 is a cross-sectional view of a stator core with a U-phase coil.
Figure 4:
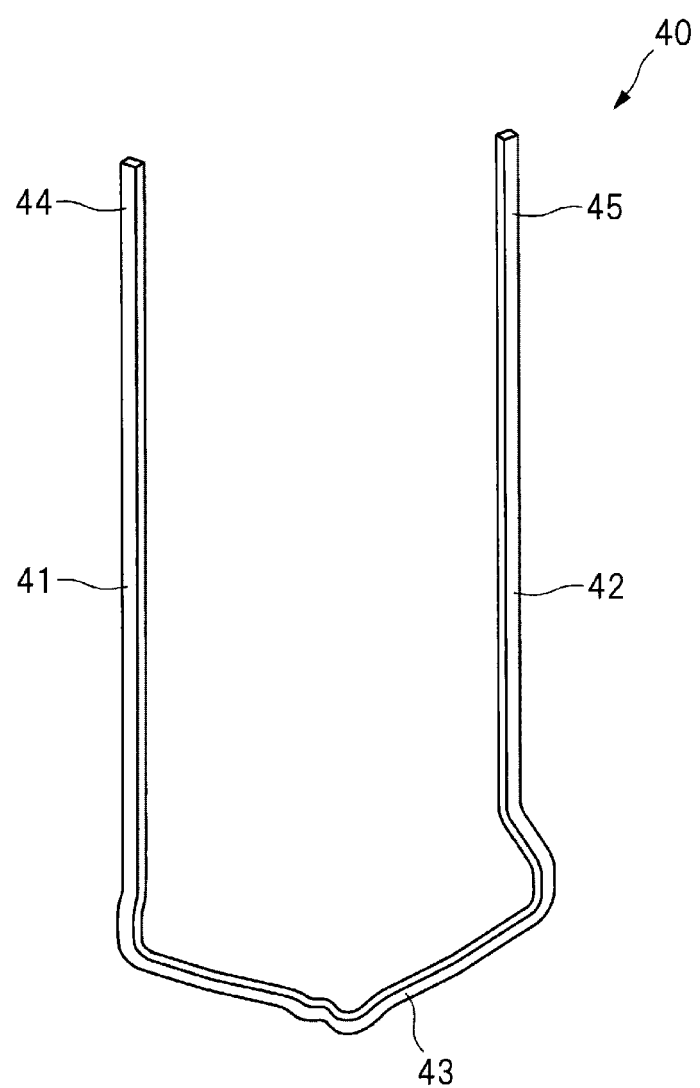
FIG. 4 is a perspective view of an example of a segment coil.

FIG. 2 is a cross-sectional view of the stator 10 taken along line A-A in FIG. 1. FIG. 3 is a cross-sectional view of the stator core 15 with a phase winding of a U phase (hereinafter referred to as U-phase coil Cu). FIG. 4 is a perspective view of one of the segment coils 40 as an example. As described later, the stator coil SC includes a phase winding of a V phase (hereinafter referred to as V-phase coil Cv) and a phase winding of a W phase (hereinafter referred to as W-phase coil Cw) as well as the U-phase coil Cu. It is noted that the U-phase coil Cu, the V-phase coil Cv, and the W-phase coil Cw in the drawings have an identical coil configuration.

As illustrated in FIG. 2, plural slots S1 to S48 are formed in an inner peripheral portion of the stator core 15 of the hollow cylindrical shape at predetermined intervals in a circumferential direction. The plural segment coils 40 are inserted in each of the slots S1 to S48. The plural segment coils 40 are coupled to one another to constitute the stator coil SC. As illustrated in FIGS. 2 and 3, the segment coils 40 that constitute the U-phase coil Cu are held in the slots S1, S2, S7, S8 . . . . As illustrated in FIG. 2, the segment coils 40 that constitute the V-phase coil Cv are held in the slots S3, S4, S9, S10 . . . , and the segment coils 40 that constitute the W-phase coil Cw are held in the slots S5, S6, S11, S12 . . . .

As illustrated in FIG. 4, each of the segment coils 40 bent substantially in the U shape includes a coil side 41 held in one of the slots (e.g., the slot S1), and a coil side 42 held in another slot (e.g., the slot S7) at a predetermined coil pitch. In one embodiment, the segment coil 40 may serve as a "segment conductor", the coil side 41 may serve as a "first conductor portion", and the coil side 42 may serve as a "second conductor portion". The segment coil 40 also includes an end portion 43 that couples the pair of coil sides 41 and 42 to each other, and weld end portions 44 and 45 that respectively extend from the pair of coil sides 41 and 42. It is noted that the segment coil 40 is made of a rectangular wire of a conductive material such as copper, and that the segment coil 40 except distal ends of the weld end portions 44 and 45 is coated with an insulating film of enamel, resin or the like. The end portion 43 of the segment coil 40 is not limited to a bent shape illustrated in FIG. 4 but is bent in various shapes in accordance with an assembling position with respect to the stator core 15.

Figure 5:
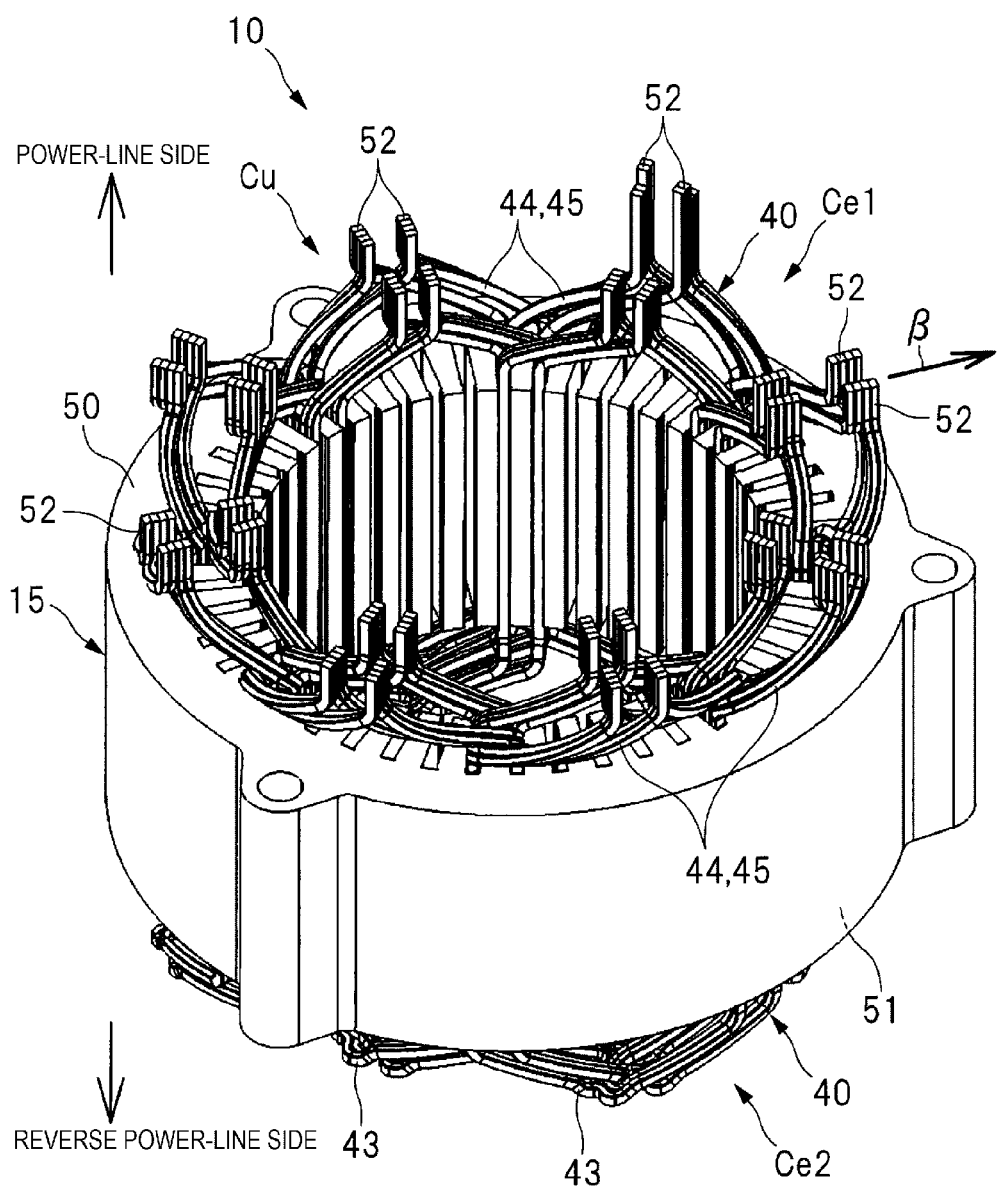
FIG. 5 is a perspective view of the U-phase coil and the stator core as viewed from a power-line side.
Figure 6A:
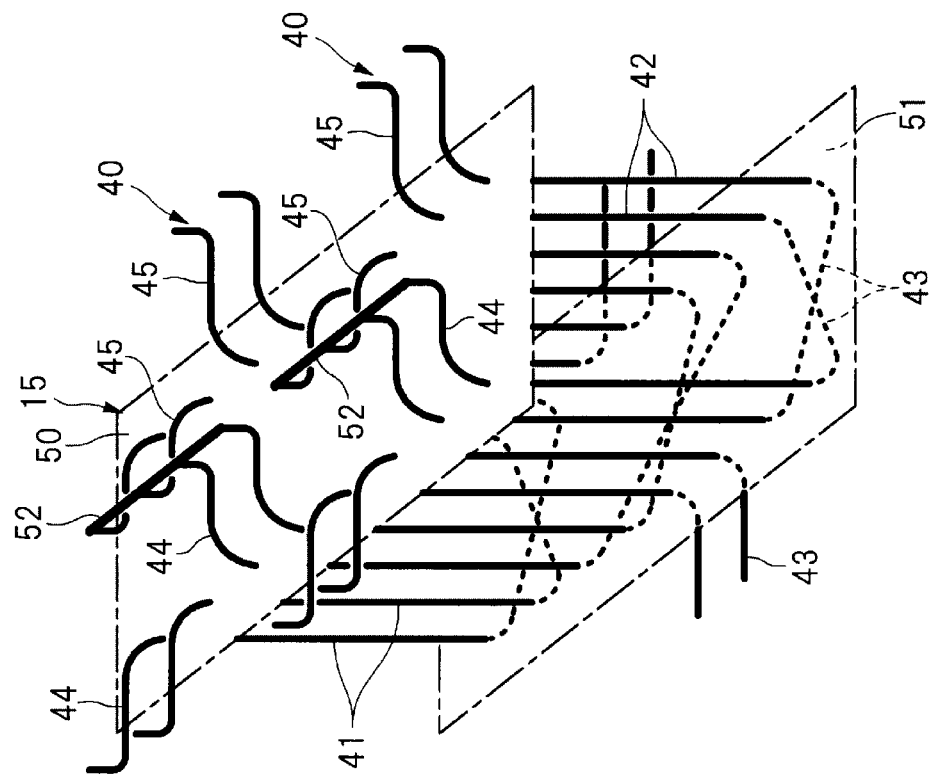
FIGS. 6A and 6B are diagrams illustrating an example of a coupling state of the segment coils.
Figure 6B:
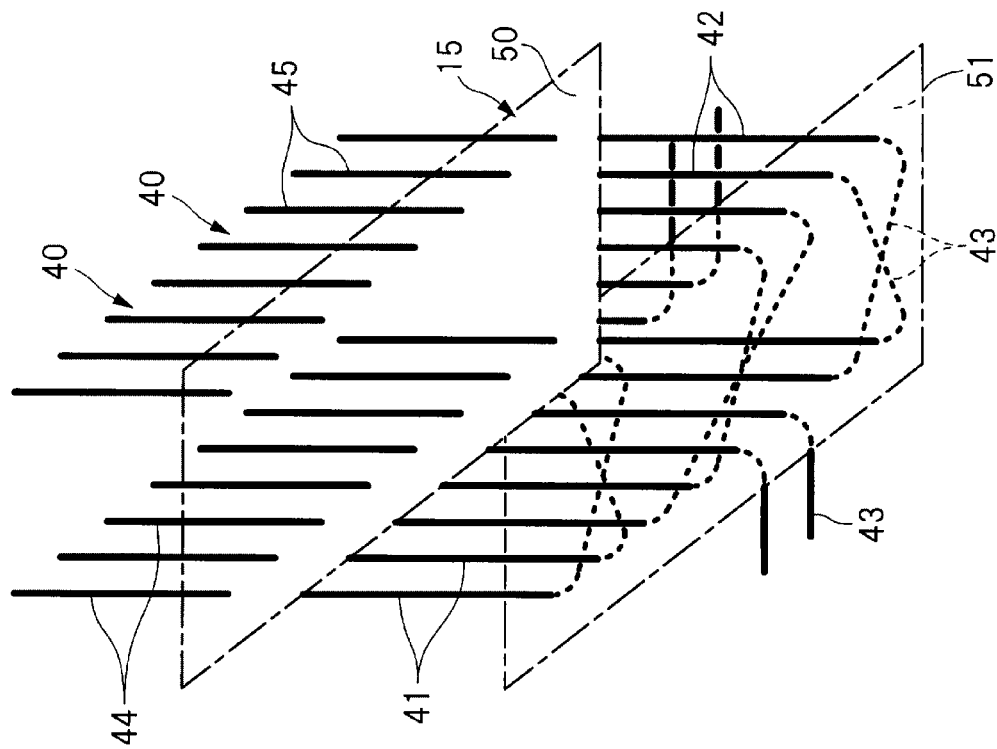

FIG. 5 is a perspective view of the U-phase coil Cu and the stator core 15 as viewed from a power-line side. It is noted that the power-line side is a side where the bus bar unit 20 is disposed. FIGS. 6A and 6B are diagrams illustrating an example of a coupling state of the segment coils 40. As described above, the plural segment coils 40 are assembled with the stator core 15. When the segment coils 40 are assembled with the stator core 15 in the above-described manner, the weld end portions 44 and 45 of the segment coils 40 protrude from one end surface 50 of the stator core 15 to the power-line side, and the end portions 43 of the segment coils 40 protrude from the other end surface 51 of the stator core 15 to a reverse power-line side as illustrated in FIGS. 5, 6A, and 6B.

As illustrated in FIG. 6B, the weld end portions 44 and 45 that protrude from the one end surface 50 of the stator core 15 are bent into contact with the weld end portions 44 and 45 of other segment coils 40 and thereafter welded to the weld end portions 44 and 45 of the other segment coils 40 in contact. Thus, the weld end portions 44 and 45 of the segment coils 40 are welded to one another to form conductor joint portions 52, and the plural segment coils 40 are electrically connected to one another into a single conductor. In this manner, the plural segment coils 40 form the U-phase coil Cu, the plural segment coils 40 form the V-phase coil Cv, and the plural segment coils 40 form the W-phase coil Cw. It is noted that the conductor joint portions 52 that have undergone welding such as TIG welding are subjected to insulating processing to form a resin film, for example, to coat the conductor.

Configuration of Stator Coil

Figure 7:
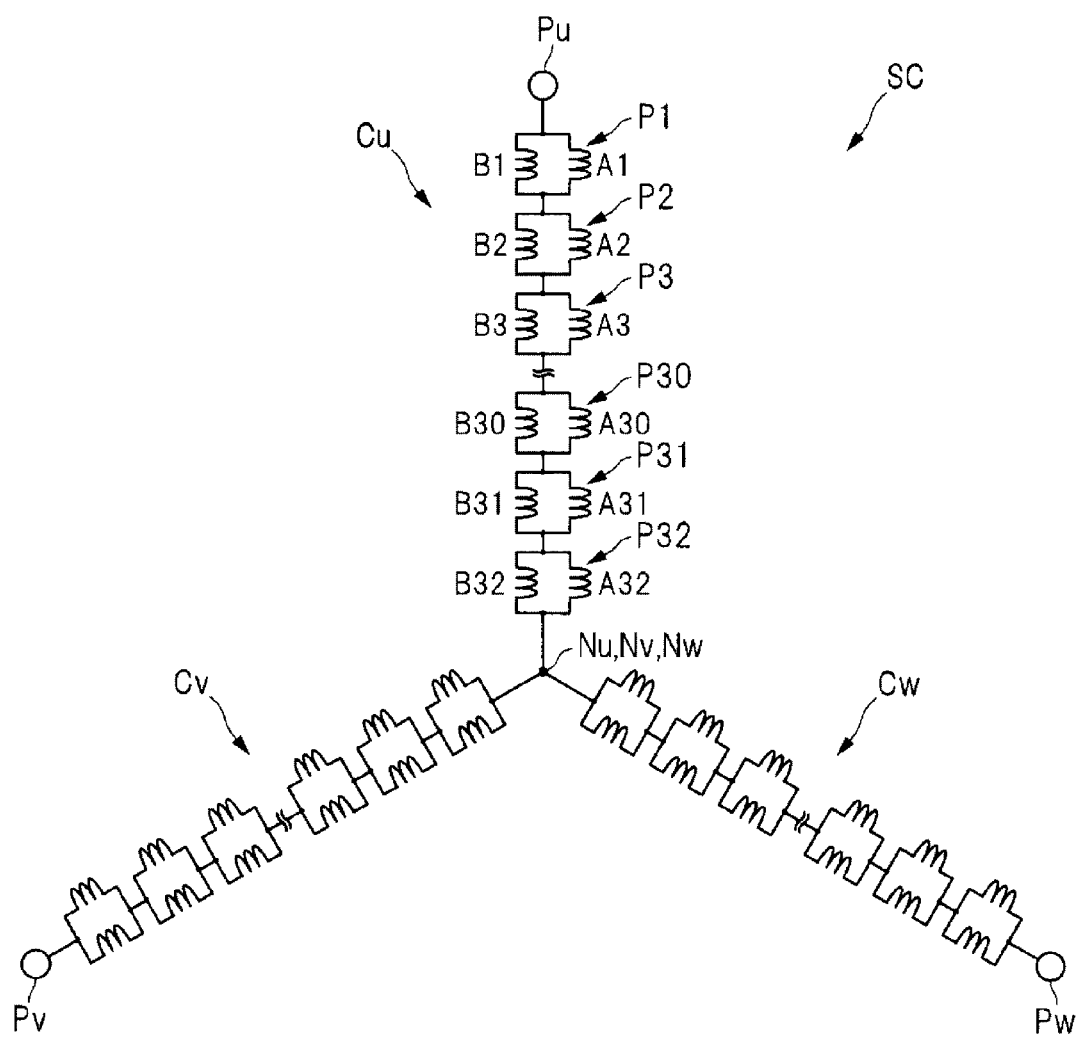
FIG. 7 is a diagram illustrating an example of a connection state of a stator coil.

FIG. 7 is a diagram illustrating an example of a connection state of the stator coil SC. It is noted that although the segment coils are denoted with a reference symbol "40" in the preceding description, the segment coils that constitute the U-phase coil Cu will be denoted with reference symbols "A1 to A32 and B1 to B32" in the following description in order to discriminate the individual segment coils. The U-phase coil Cu will now be mainly described. As described above, each of the phase coils Cu, Cv, and Cw has the identical coil configuration.

As illustrated in FIG. 7, the U-phase coil Cu, the V-phase coil Cv, and the W-phase coil Cw constitute the stator coil SC. The U-phase coil Cu includes plural parallel coils P1 to P32 connected to one another in series. In one embodiment, the parallel coils P1 to P32 may serve as "parallel conductors". Each of the parallel coils P1 to P32 includes two segment coils A1 and B1, . . . connected to each other in parallel. In one embodiment, the segment coils A1 and B1, . . . may serve as "segment conductors". For example, the parallel coil P1 includes the two segment coils A1 and B1, and the parallel coil P2 includes two segment coils A2 and B2. The parallel coil P31 includes two segment coils A31 and B31, and the parallel coil P32 includes two segment coils A32 and B32. One end of the U-phase coil Cu serves as a power point Pu, and the other end of the U-phase coil Cu serves as a neutral point Nu.

Similarly, the V-phase coil Cv includes plural parallel coils connected to one another in series. In one embodiment, the parallel coils of the V-phase coil Cv may serve as "parallel conductors". One end of the V-phase coil Cv serves as a power point Pv, and the other end of the V-phase coil Cv serves as a neutral point Nv. The W-phase coil Cw includes plural parallel coils connected to one another in series. In one embodiment, the parallel coils of the W-phase coil Cw may serve as "parallel conductors". One end of the W-phase coil Cw serves as a power point Pw, and the other end of the W-phase coil Cw serves as a neutral point Nw. The neutral point Nu of the U-phase coil Cu, the neutral point Nv of the V-phase coil Cv, and the neutral point Nw of the W-phase coil Cw are coupled to one another. These phase coils Cu, Cv, and Cw constitute the stator coil SC.

Configuration of U-Phase Coil (Outline)

Figure 8:
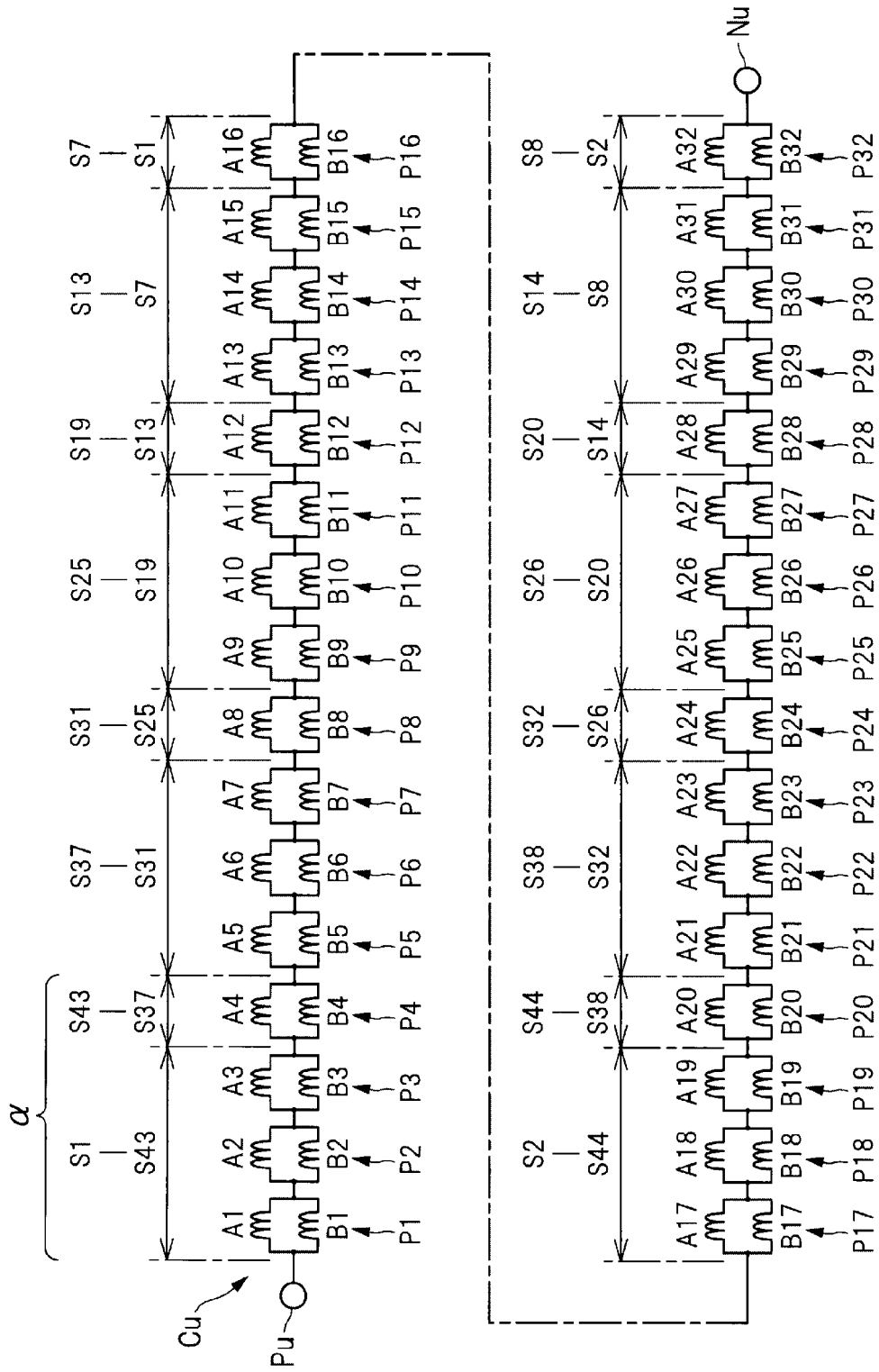
FIG. 8 is a diagram illustrating an example of a coil configuration of the U-phase coil.
Figure 9:
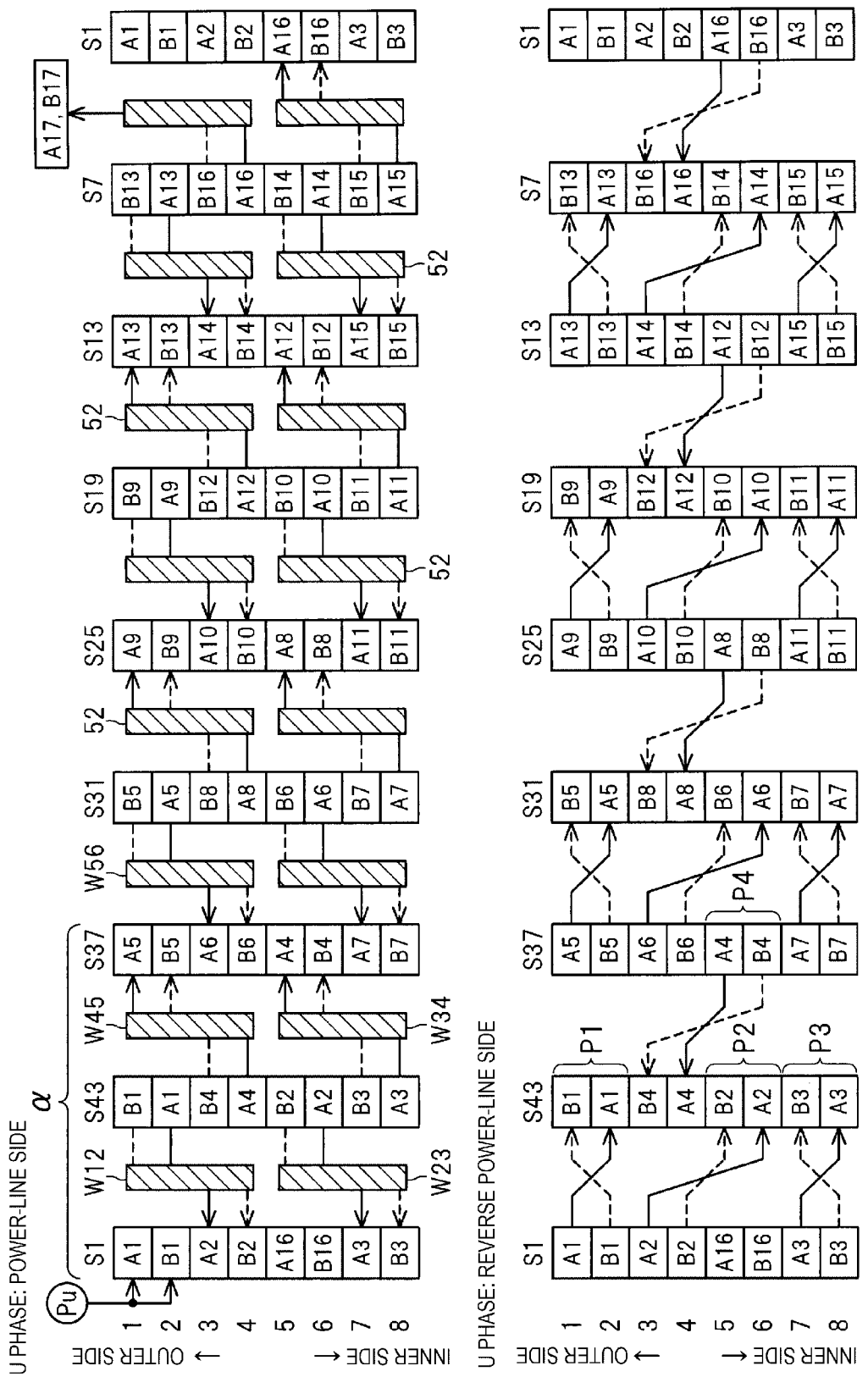
FIG. 9 is a diagram illustrating holding positions of the segment coils that constitute the U-phase coil with respect to slots.

FIG. 8 is a diagram illustrating an example of the coil configuration of the U-phase coil Cu. Slot numbers in FIG. 8 denote slots where the individual segment coils A1 to A32 and B1 to B32 are held. FIGS. 9 and 10 are diagrams illustrating holding positions of the segment coils A1 to A32 and B1 to B32 that constitute the U-phase coil Cu with respect to the slots S1, S2, S7, S8 . . . . FIG. 9 illustrates holding positions of the segment coils A1 to A16 and B1 to B16, and FIG. 10 illustrates holding positions of the segment coils A17 to A32 and B17 to B32.

The "power-line side" illustrated in FIGS. 9 and 10 refers to a side where the weld end portions 44 and 45 of the segment coils 40 are located as illustrated in FIGS. 1 and 5. The "reverse power-line side" illustrated in FIGS. 9 and 10 refers to a side opposite to the power-line side, that is, a side where the end portions 43 of the segment coils 40 are located as illustrated in FIGS. 1 and 5. As illustrated in FIG. 3, an "inner side" illustrated in FIGS. 9 and 10 refers to an inner side of the stator core 15 in the radial direction, and an "outer side" illustrated in FIGS. 9 and 10 refers to an outer side of the stator core 15 in the radial direction. It is noted that in FIGS. 9 and 10, the segment coil A1 to A32 are indicated with solid lines, and the segment coils B1 to B32 are indicated with dashed lines. Directions of arrows in FIGS. 9 and 10 refer to directions from the power point Pu to the neutral point Nu.

Shadowed portions in FIGS. 9 and 10 indicate the conductor joint portions 52 where the weld end portions of the segment coils A1 to A32 and B1 to B32 are welded to each other. In the preceding description, the conductor joint portions are denoted with a reference symbol "52". However, in the following description, to discriminate specified conductor joint portions, the specified conductor joint portions will be denoted with reference symbols "W12, W23, W34, W45, and W56" other than "52".

As illustrated in FIG. 8, the U-phase coil Cu has a coil configuration where a connection pattern of four parallel coils (e.g., P1 to P4) is repeated. That is, the U-phase coil Cu has a coil configuration where a connection pattern of eight segment coils (e.g., A1 to A4 and B1 to B4) is repeated. A connection pattern of the segment coils A1 to A4 and B1 to B4 as one unit of connection pattern will now be described as indicated by a reference symbol α in FIGS. 8 and 9.

As illustrated in FIG. 9, eight segment coils 40 are held in each slot. First, the segment coil A1 extends over and is held in a first position (an outer position) of the slot S1 and a second position of the slot S43. The segment coil B1 extends over and is held in a second position of the slot S1 and a first position of the slot S43. The segment coil A2 extends over and is held in a third position of the slot S1 and a sixth position of the slot S43. The segment coil B2 extends over and is held in a fourth position of the slot S1 and a fifth position of the slot S43. The segment coil A3 extends over and is held in a seventh position of the slot S1 and an eighth position of the slot S43. The segment coil B3 extends over and is held in an eighth position of the slot S1 and a seventh position of the slot S43. The segment coil A4 extends over and is held in a fourth position of the slot S43 and a fifth position of the slot S37. The segment coil B4 extends over and is held in a third position of the slot S43 and a sixth position of the slot S37.

Between the slots S1 and S43 on the power-line side, the segment coils A2 and B2 that extend from the slot S1 and the segment coils A1 and B1 that extend from the slot S43 are welded to each other via a conductor joint portion W12. The segment coils A3 and B3 that extend from the slot S1 and the segment coils A2 and B2 that extend from the slot S43 are welded to each other via a conductor joint portion W23. Between the slots S43 and S37, the segment coils A3 and B3 that extend from the slot S43 and the segment coils A4 and B4 that extend from the slot S37 are welded to each other via a conductor joint portion W34. The segment coils A4 and B4 that extend from the slot S43 and the segment coils A5 and B5 that extend from the slot S37 are welded to each other via a conductor joint portion W45. The segment coils A6 and B6 that constitute a next connection pattern are welded to the segment coils A5 and B5 that extend from the slot S31, via a conductor joint portion W56. Such a connection pattern is repeated to connect the segment coils A1 to A32 and B1 to B32. Thus, as illustrated in FIGS. 8 to 10, the segment coils A1 to A32 and B1 to B32 constitute the U-phase coil Cu.

Configuration of U-Phase Coil (Detail)

Figure 12:
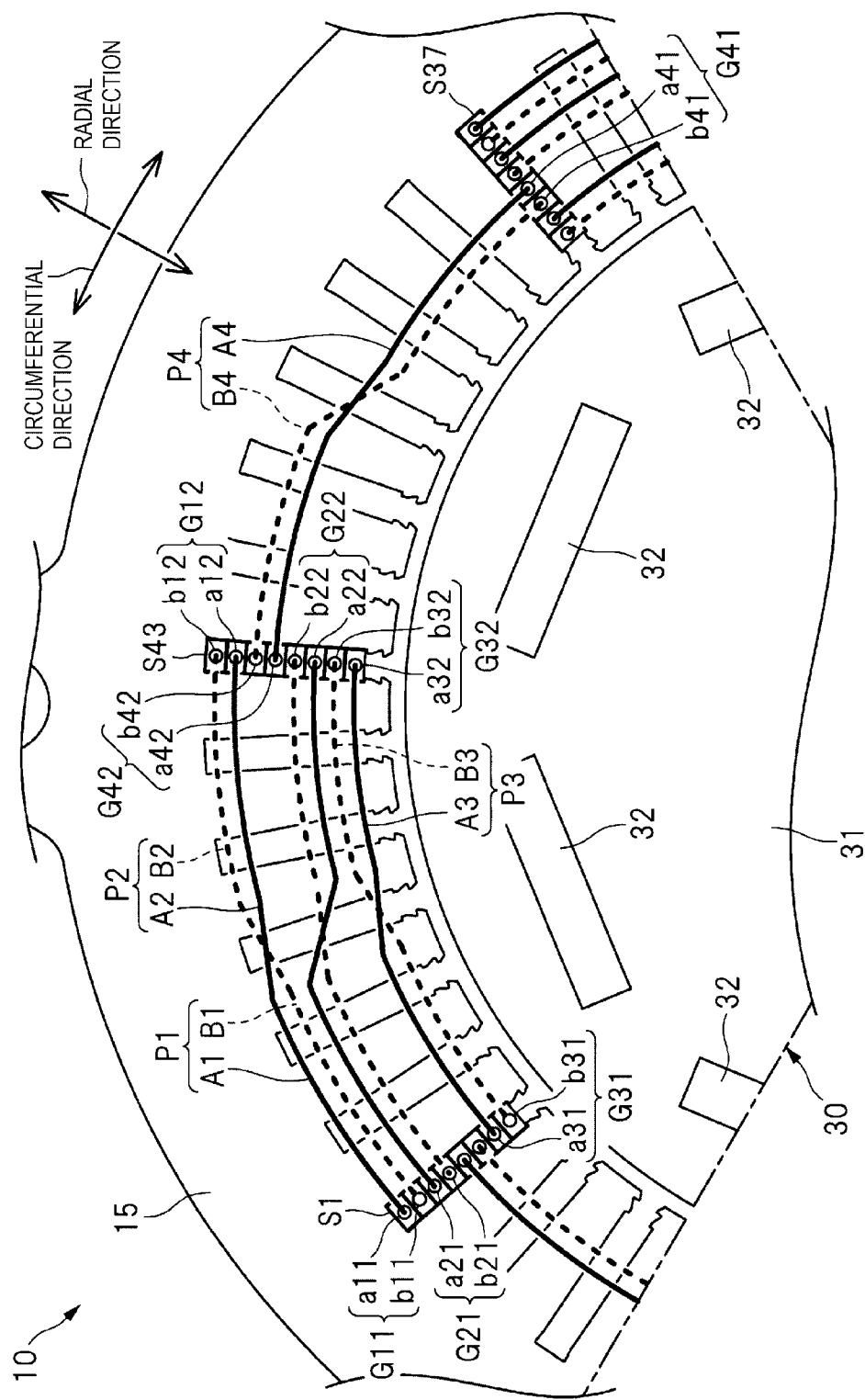
FIG. 12 is a diagram illustrating how the segment coils are attached to the stator core from a reverse power-line side.

Next, the coil configuration of the U-phase coil Cu will be described in more detail. FIG. 11 is an enlarged view of a range α in FIG. 9. That is, FIG. 11 illustrates holding positions of the segment coils A1 to A7 and B1 to B7 in the slots S1, S37, and S43. FIG. 12 is a diagram illustrating how the segment coils A1 to A4 and B1 to B4 are attached to the stator core 15 from the reverse power-line side.

Parallel Coil P1

As illustrated in FIGS. 11 and 12, the parallel coil P1 includes the segment coil A1 and the segment coil B1. In one embodiment, the parallel coil P1 may serve as the parallel conductor, the segment coil A1 may serve as a "segment conductor" and a "first segment conductor", and the segment coil B1 may serve as a "segment conductor" and a "second segment conductor". One of the segment coils A1 includes two coil sides a11 and a12, and the other segment coil B1 includes two coil sides b11 and b12. The coil side a11 of the segment coil A1 is held in the first position of the slot S1, and the coil side a12 of the segment coil A1 is held in the second position of the slot S43. The coil side b11 of the segment coil B1 is held in the second position of the slot S1, and the coil side b12 of the segment coil B1 is held in the first position of the slot S43.

Here, the parallel coil P1 is regarded as a reference parallel coil, and the segment coils A1 and B1 that constitute the parallel coil P1 are regarded as reference segment coils. In one embodiment, the parallel coil P1 may serve as a "reference parallel conductor", and the segment coils A1 and B1 may serve as "reference segment conductors". In this case, the segment coil A1 includes the coil side a11 that is held in the slot S1 and constitutes a coil group G11, and the coil side a12 that is held in the slot S43 and constitutes a coil group G12. In one embodiment, the slot S1 may serve as a "first slot", the coil group G11 may serve as a "first conductor portion group", the coil side a11 may serve as a "first conductor portion", the slot S43 may serve as a "second slot", the coil group G12 may serve as a "second conductor portion group", and the coil side a12 may serve as a second conductor portion. The segment coil B1 includes the coil side b11 that is held in the slot S1 and constitutes the coil group G11, and the coil side b12 that is held in the slot S43 and constitutes the coil group G12. In one embodiment, the coil side b11 may serve as the first conductor portion, and the coil side b12 may serve as the second conductor portion. The coil sides a11 and b11 that constitute the coil group G11 are disposed side by side, and the coil sides a12 and b12 that constitute the coil group G12 are disposed side by side.

In the coil group G11, the coil side a11 of the segment coil A1 is located at an outermost position in the radial direction, and the coil side b11 of the segment coil B1 is located at an innermost position in the radial direction. In the coil group G12, the coil side a12 of the segment coil A1 is located at an innermost position in the radial direction, and the coil side b12 of the segment coil B1 is located at an outermost position in the radial direction. That is, the segment coil A1 that constitutes the parallel coil P1 includes the coil side a11, as the first conductor portion, located at the outermost position in the radial direction in the coil group G11, and the coil side a12, as the second conductor portion, located at the innermost position in the radial direction in the coil group G12. In one embodiment, the coil side a11 may serve as an "outer conductor portion", and the coil side a12 may serve as an "inner conductor portion". The segment coil B1 that constitutes the parallel coil P1 includes the coil side b11, as the first conductor portion, located at the innermost position in the radial direction in the coil group G11, and the coil side b12, as the second conductor portion, located at the outermost position in the radial direction in the coil group G12. In one embodiment, the coil side b11 may serve as an "inner conductor portion", and the coil side b12 may serve as an "outer conductor portion".

Circulating Current in Parallel Coil P1

Figure 13:
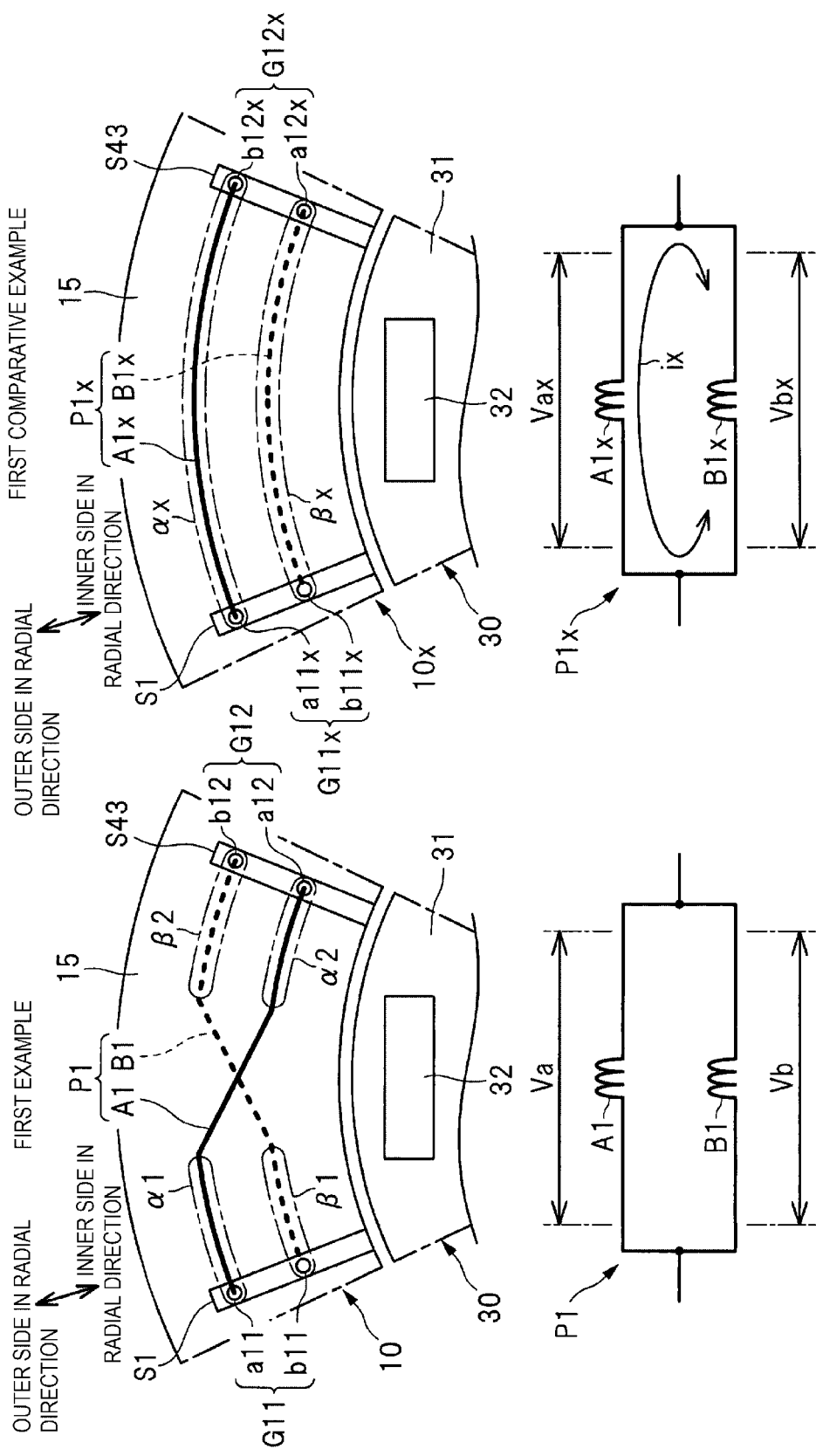
FIG. 13A is a simplified partial view of the stator as a first example, illustrating induction voltages generated in a parallel coil.
FIG. 13B is a simplified partial view of a stator as a first comparative example, illustrating induction voltages generated in a parallel coil.

The coil sides a11, a12, b11, and b12 of the segment coils A1 and B1 are disposed as illustrated in FIGS. 11 and 12 so that generation of a circulating current in the parallel coil P1 can be prevented. FIG. 13A is a simplified partial view of the stator 10 as a first example, illustrating induction voltages generated in the parallel coil P1. FIG. 13B is a simplified partial view of a stator 10x as a first comparative example, illustrating induction voltages generated in a parallel coil P1x.

As illustrated in FIG. 13A, the segment coils A1 and B1 of the parallel coil P1 as the first example are attached to the stator core 15 while crossing each other. That is, the coil side a11 of the segment coil A1 is located on an outer side of the coil side b11 of the segment coil B1 in the radial direction whereas the coil side a12 of the segment coil A1 is located on an inner side of the coil side b12 of the segment coil B1 in the radial direction.

In other words, as indicated with reference symbols $\alpha 1$ and $\beta 1$, the coil side a11 and its vicinity of the segment coil A1 is farther from the permanent magnet 32 of the rotor 30 than the coil side b11 and its vicinity of the segment coil B1 is from the permanent magnet 32. Consequently, an induction voltage of the coil side a11 and its vicinity is lower than an induction voltage of the coil side b11 and its vicinity of the segment coil B1. Meanwhile, as indicated with reference symbols $\alpha 2$ and $\beta 2$, the coil side a12 and its vicinity of the segment coil A1 is closer to the permanent magnet 32 of the rotor 30 than the coil side b12 and its vicinity of the segment coil B1 is to the permanent magnet 32. Consequently, an induction voltage of the coil side a12 and its vicinity is higher than an induction voltage of the coil side b12 and its vicinity of the segment coil B1.

As described above, in the segment coil A1, the induction voltage of the coil side a11 is lower than the induction voltage of the coil side b11, and the induction voltage of the coil side a12 is higher than the induction voltage of the coil side b12. In the segment coil B1, the induction voltage of the coil side b11 is higher than the induction voltage of the coil side a11, and the induction voltage of the coil side b12 is lower than the induction voltage of the coil side a12. This makes an induction voltage Va generated in the segment coil A1 and an induction voltage Vb generated in the segment coil B1 substantially equal to each other. In this manner, in the stator 10 of the first example, the segment coils A1 and B1 are less likely to have a potential difference so that a circulating current that flows between the segment coils A1 and B1 can be eliminated or reduced to enhance energy efficiency of the rotary electric machine.

In contrast, as illustrated in FIG. 13B, segment coils A1x and B1x of the parallel coil P1x as the first comparative example are attached to the stator core 15 and are parallel to each other. That is, a coil side a11x of the segment coil A1x is located on an outer side of a coil side b11x of the segment coil B1x in the radial direction, and a coil side a12x of the segment coil A1x is located on an outer side of a coil side b12x of the segment coil B1x in the radial direction.

In other words, as indicated with reference symbols $\alpha x$ and $\beta x$, the segment coil A1x is farther from the permanent magnet 32 of the rotor 30 than the segment coil B1x is from the permanent magnet 32. Consequently, an induction voltage Vax of the segment coil A1x is lower than an induction voltage Vbx of the segment coil B1x. That is, the induction voltage Vax generated in the segment coil A1x and the induction voltage Vbx generated in the segment coil B1x are different from each other. In this manner, in the stator 10x of the first comparative example, the segment coils A1x and B1x have a potential difference so that a circulating current ix is generated between the segment coils A1x and B1x, thus lowering energy efficiency of the rotary electric machine.

Parallel Coil P2

Next, the parallel coil P2 will be described. As illustrated in FIGS. 11 and 12, the parallel coil P2 includes the segment coil A2 and the segment coil B2. In one embodiment, the parallel coil P2 may serve as the parallel conductor, the segment coil A2 may serve as a "segment conductor" and a "first segment conductor", and the segment coil B2 may serve as a "segment conductor" and a "second segment conductor". One of the segment coils A2 includes two coil sides a21 and a22, and the other segment coil B2 includes two coil sides b21 and b22. The coil side a21 of the segment coil A2 is held in the third position of the slot S1, and the coil side a22 of the segment coil A2 is held in the sixth position of the slot S43. The coil side b21 of the segment coil B2 is held in the fourth position of the slot S1, and the coil side b22 of the segment coil B2 is held in the fifth position of the slot S43.

Here, the parallel coil P2 is regarded as a reference parallel coil, and the segment coils A2 and B2 that constitute the parallel coil P2 are regarded as reference segment coils. In one embodiment, the parallel coil P2 may serve as a "reference parallel conductor", and the segment coils A2 and B2 may serve as "reference segment conductors". In this case, the segment coil A2 includes the coil side a21 that is held in the slot S1 and constitutes a coil group G21, and the coil side a22 that is held in the slot S43 and constitutes a coil group G22. In one embodiment, the coil side a21 may serve as a "first conductor portion", the coil group G21 may serve as a "first conductor portion group", the coil side a22 may serve as a "second conductor portion", and the coil group G22 may serve as a "second conductor portion group". The segment coil B2 includes the coil side b21 that is held in the slot S1 and constitutes the coil group G21, and the coil side b22 that is held in the slot S43 and constitutes the coil group G22. In one embodiment, the coil side b21 may serve as a "first conductor portion", and the coil side b22 may serve as a "second conductor portion". The coil sides a21 and b21 that constitute the coil group G21 are disposed side by side, and the coil sides a22 and b22 that constitute the coil group G22 are disposed side by side.

In the coil group G21, the coil side a21 of the segment coil A2 is located at an outermost position in the radial direction, and the coil side b21 of the segment coil B2 is located at an innermost position in the radial direction. In the coil group G22, the coil side a22 of the segment coil A2 is located at an innermost position in the radial direction, and the coil side b22 of the segment coil B2 is located at an outermost position in the radial direction. That is, the segment coil A2 that constitutes the parallel coil P2 includes the coil side a21, as the first conductor portion, located at the outermost position in the radial direction in the coil group G21, and the coil side a22, as the second conductor portion, located at the innermost position in the radial direction in the coil group G22. In one embodiment, the coil side a21 may serve as an "outer conductor portion", and the coil side a22 may serve as an "inner conductor portion". The segment coil B2 that constitutes the parallel coil P2 includes the coil side b21, as the first conductor portion, located at the innermost position in the radial direction in the coil group G21, and the coil side b22, as the second conductor portion, located at the outermost position in the radial direction in the coil group G22. In one embodiment, the coil side b21 may serve as an "inner conductor portion", and the coil side b22 may serve as an "outer conductor portion".

In the segment coil A2, even when the parallel coil P2 has such a configuration, an induction voltage of the coil side a21 is lower than an induction voltage of the coil side b21, and an induction voltage of the coil side a22 is higher than an induction voltage of the coil side b22 in a manner similar to the above-described parallel coil P1. In the segment coil B2, the induction voltage of the coil side b21 is higher than the induction voltage of the coil side a21, and the induction voltage of the coil side b22 is lower than the induction voltage of the coil side a22. This makes an induction voltage generated in the segment coil A2 and an induction voltage generated in the segment coil B2 substantially equal to each other. In this manner, in the parallel coil P2, the segment coils A2 and B2 are less likely to have a potential difference so that a circulating current that flows between the segment coils A2 and B2 can be eliminated or reduced to enhance energy efficiency of the rotary electric machine.

Parallel Coil P3

Next, the parallel coil P3 will be described. As illustrated in FIGS. 11 and 12, the parallel coil P3 includes the segment coil A3 and the segment coil B3. In one embodiment, the parallel coil P3 may serve as the parallel conductor, the segment coil A3 may serve as a "segment conductor" and a "first segment conductor", and the segment coil B3 may serve as a "segment conductor" and a "second segment conductor". One of the segment coils A3 includes two coil sides a31 and a32, and the other segment coil B3 includes two coil sides b31 and b32. The coil side a31 of the segment coil A3 is held in the seventh position of the slot S1, and the coil side a32 of the segment coil A3 is held in the eighth position of the slot S43. The coil side b31 of the segment coil B3 is held in the eighth position of the slot S1, and the coil side b32 of the segment coil B3 is held in the seventh position of the slot S43.

Here, the parallel coil P3 is regarded as a reference parallel coil, and the segment coils A3 and B3 that constitute the parallel coil P3 are regarded as reference segment coils. In one embodiment, the parallel coil P3 may serve as a "reference parallel conductor", and the segment coils A3 and B3 may serve as "reference segment conductors". In this case, the segment coil A3 includes the coil side a31 that is held in the slot S1 and constitutes a coil group G31, and the coil side a32 that is held in the slot S43 and constitutes a coil group G32. In one embodiment, the coil side a31 may serve as a "first conductor portion", the coil group G31 may serve as a "first conductor portion group", the coil side a32 may serve as a "second conductor portion", and the coil group G32 may serve as a "second conductor portion group". The segment coil B3 includes the coil side b31 that is held in the slot S1 and constitutes the coil group G31, and the coil side b32 that is held in the slot S43 and constitutes the coil group G32. In one embodiment, the coil side b31 may serve as a "first conductor portion", and the coil side b32 may serve as a "second conductor portion". The coil sides a31 and b31 that constitute the coil group G31 are disposed side by side, and the coil sides a32 and b32 that constitute the coil group G32 are disposed side by side.

In the coil group G31, the coil side a31 of the segment coil A3 is located at an outermost position in the radial direction, and the coil side b31 of the segment coil B3 is located at an innermost position in the radial direction. In the coil group G32, the coil side a32 of the segment coil A3 is located at an innermost position in the radial direction, and the coil side b32 of the segment coil B3 is located at an outermost position in the radial direction. That is, the segment coil A3 that constitutes the parallel coil P3 includes the coil side a31, as the first conductor portion, located at the outermost position in the radial direction in the coil group G31, and the coil side a32, as the second conductor portion, located at the innermost position in the radial direction in the coil group G32. In one embodiment, the coil side a31 may serve as an "outer conductor portion", and the coil side a32 may serve as an "inner conductor portion". The segment coil B3 that constitutes the parallel coil P3 includes the coil side b31, as the first conductor portion, located at the innermost position in the radial direction in the coil group G31, and the coil side b32, as the second conductor portion, located at the outermost position in the radial direction in the coil group G32. In one embodiment, the coil side b31 may serve as an "inner conductor portion", and the coil side b32 may serve as an "outer conductor portion".

In the segment coil A3, even when the parallel coil P3 has such a configuration, an induction voltage of the coil side a31 is lower than an induction voltage of the coil side b31, and an induction voltage of the coil side a32 is higher than an induction voltage of the coil side b32 in a manner similar to the above-described parallel coil P1. In the segment coil B3, the induction voltage of the coil side b31 is higher than the induction voltage of the coil side a31, and the induction voltage of the coil side b32 is lower than the induction voltage of the coil side a32. This makes an induction voltage generated in the segment coil A3 and an induction voltage generated in the segment coil B3 substantially equal to each other. In this manner, in the parallel coil P3, the segment coils A3 and B3 are less likely to have a potential difference so that a circulating current that flows between the segment coils A3 and B3 can be eliminated or reduced to enhance energy efficiency of the rotary electric machine.

Parallel Coil P4

Next, the parallel coil P4 will be described. As illustrated in FIGS. 11 and 12, the parallel coil P4 includes the segment coil A4 and the segment coil B4. In one embodiment, the parallel coil P4 may serve as the "parallel conductor", the segment coil A4 may serve as a "segment conductor" and a "first segment conductor", and the segment coil B4 may serve as a "segment conductor" and a "second segment conductor". One of the segment coils A4 includes two coil sides a41 and a42, and the other segment coil B4 includes two coil sides b41 and b42. The coil side a41 of the segment coil A4 is held in the fifth position of the slot S37, and the coil side a42 of the segment coil A4 is held in the fourth position of the slot S43. The coil side b41 of the segment coil B4 is held in the sixth position of the slot S37, and the coil side b42 of the segment coil B4 is held in the third position of the slot S43.

Here, the parallel coil P4 is regarded as a reference parallel coil, and the segment coils A4 and B4 that constitute the parallel coil P4 are regarded as reference segment coils. In one embodiment, the parallel coil P4 may serve as a "reference parallel conductor", and the segment coils A4 and B4 may serve as "reference segment conductors". In this case, the segment coil A4 includes the coil side a41 that is held in the slot S37 and constitutes a coil group G41, and the coil side a42 that is held in the slot S43 and constitutes a coil group G42. In one embodiment, the coil side a41 may serve as a "first conductor portion", the slot S37 may serve as a "first slot", the coil group G41 may serve as a "first conductor portion group", the coil side a42 may serve as a "second conductor portion", and the coil group G42 may serve as a "second conductor portion group". The segment coil B4 includes the coil side b41 that is held in the slot S37 and constitutes the coil group G41, and the coil side b42 that is held in the slot S43 and constitutes the coil group G42. In one embodiment, the coil side b41 may serve as a "first conductor portion", and the coil side b42 may serve as a "second conductor portion". The coil sides a41 and b41 that constitute the coil group G41 are disposed side by side, and the coil sides a42 and b42 that constitute the coil group G42 are disposed side by side.

In the coil group G41, the coil side a41 of the segment coil A4 is located at an outermost position in the radial direction, and the coil side b41 of the segment coil B4 is located at an innermost position in the radial direction. In the coil group G42, the coil side a42 of the segment coil A4 is located at an innermost position in the radial direction, and the coil side b42 of the segment coil B4 is located at an outermost position in the radial direction. That is, the segment coil A4 that constitutes the parallel coil P4 includes the coil side a41, as the first conductor portion, located at the outermost position in the radial direction in the coil group G41, and the coil side a42, as the second conductor portion, located at the innermost position in the radial direction in the coil group G42. In one embodiment, the coil side a41 may serve as an "outer conductor portion", and the coil side a42 may serve as an "inner conductor portion". The segment coil B4 that constitutes the parallel coil P4 includes the coil side b41, as the first conductor portion, located at the innermost position in the radial direction in the coil group G41, and the coil side b42, as the second conductor portion, located at the outermost position in the radial direction in the coil group G42. In one embodiment, the coil side b41 may serve as an "inner conductor portion", and the coil side b42 may serve as an "outer conductor portion".

In the segment coil A4, even when the parallel coil P4 has such a configuration, an induction voltage of the coil side a41 is lower than an induction voltage of the coil side b41, and an induction voltage of the coil side a42 is higher than an induction voltage of the coil side b42 in a manner similar to the above-described parallel coil P1. In the segment coil B4, the induction voltage of the coil side b41 is higher than the induction voltage of the coil side a41, and the induction voltage of the coil side b42 is lower than the induction voltage of the coil side a42. This makes an induction voltage generated in the segment coil A4 and an induction voltage generated in the segment coil B4 substantially equal to each other. In this manner, in the parallel coil P4, the segment coils A4 and B4 are less likely to have a potential difference so that a circulating current that flows between the segment coils A4 and B4 can be eliminated or reduced to enhance energy efficiency of the rotary electric machine.

Distances from Stator Core Center to Coil Sides

Figure 14:
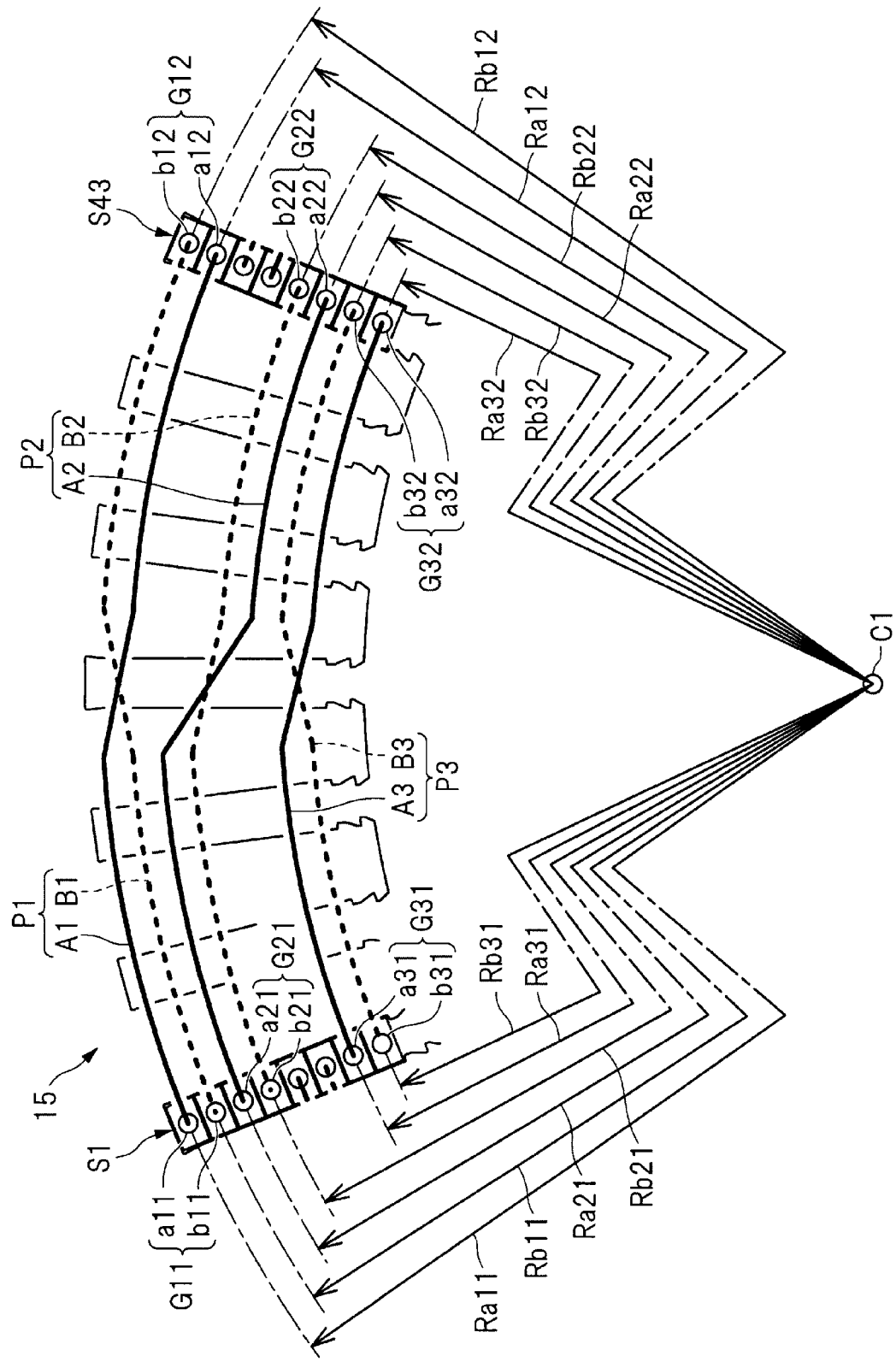
FIG. 14 is a diagram illustrating the parallel coils attached to the stator core.

Next, the parallel coils P1 to P3 will be taken as an example to describe distances from a center C1 of the stator core 15 to coil sides. FIG. 14 is a diagram illustrating the parallel coils P1 to P3 attached to the stator core 15. It is noted that distances Ra11, . . . indicated in FIG. 14 are distances from the center C1 of the stator core 15 to centers of the respective coil sides a11, . . . .

As described above, in the parallel coil P1, the coil side a11 of the segment coil A1 is located on an outer side of the coil side b11 of the segment coil B1 in the radial direction whereas the coil side a12 of the segment coil A1 is located on an inner side of the coil side b12 of the segment coil B1 in the radial direction. This can reduce a potential difference between the segment coils A1 and B1 so as to eliminate or reduce a circulating current between the segment coils A1 and B1. In some embodiments, to make the potential difference between the segment coils A1 and B1 close to "0", distances from the rotor 30 to the coil sides a11 and b12 coincide with each other, and also, distances from the rotor 30 to the coil sides a12 and b11 coincide with each other. In one example, as illustrated in FIG. 14, a distance Ra11 from the center C1 of the stator core 15 to the coil side a11 and a distance Rb12 from the center C1 of the stator core 15 to the coil side b12 are made equal to each other, and also, a distance Ra12 from the center C1 of the stator core 15 to the coil side a12 and a distance Rb11 from the center C1 of the stator core 15 to the coil side b11 are made equal to each other.

In the parallel coil P2, the coil side a21 of the segment coil A2 is located on an outer side of the coil side b21 of the segment coil B2 in the radial direction whereas the coil side a22 of the segment coil A2 is located on an inner side of the coil side b22 of the segment coil B2 in the radial direction. This can reduce a potential difference between the segment coils A2 and B2 so as to eliminate or reduce a circulating current between the segment coils A2 and B2. In some embodiments, to make the potential difference between the segment coils A2 and B2 close to "0", a sum of distances from the rotor 30 to the coil sides a21 and a22 and a sum of distances from the rotor 30 to the coil sides b21 and b22 coincide with each other. In one example, as illustrated in FIG. 14, a sum (Ra21+Ra22) of distances from the center C1 of the stator core 15 to the coil sides a21 and a22 and a sum (Rb21+Rb22) of distances from the center C1 of the stator core 15 to the coil sides b21 and b22 are made equal to each other.

In the parallel coil P3, the coil side a31 of the segment coil A3 is located on an outer side of the coil side b31 of the segment coil B3 in the radial direction whereas the coil side a32 of the segment coil A3 is located on an inner side of the coil side b32 of the segment coil B3 in the radial direction. This can reduce a potential difference between the segment coils A3 and B3 so as to eliminate or reduce a circulating current between the segment coils A3 and B3. In some embodiments, to make the potential difference between the segment coils A3 and B3 close to "0", distances from the rotor 30 to the coil sides a31 and b32 coincide with each other, and also, distances from the rotor 30 to the coil sides a32 and b31 coincide with each other. In one example, as illustrated in FIG. 14, a distance Ra31 from the center C1 of the stator core 15 to the coil side a31 and a distance Rb32 from the center C1 of the stator core 15 to the coil side b32 are made equal to each other, and also, a distance Ra32 from the center C1 of the stator core 15 to the coil side a32 and a distance Rb31 from the center C1 of the stator core 15 to the coil side b31 are made equal to each other.

Size Reduction of Coil End

As illustrated in FIG. 11, to form the parallel coils P1 to P4 and connect these parallel coils P1 to P4 to each other in series, the segment coils A1 to A5 and B1 to B5 are connected to one another with the conductor joint portions W12, W23, W34, and W45. In one example, at the conductor joint portion W12, the weld end portions a14, a23, b14, and b23 of the segment coils A1, A2, B1, and B2 are welded together, and at the conductor joint portion W23, the weld end portions a24, a33, b24, and b33 of the segment coils A2, A3, B2, and B3 are welded together. At the conductor joint portion W34, the weld end portions a34, a43, b34, and b43 of the segment coils A3, A4, B3, and B4 are welded together, and at the conductor joint portion W45, the weld end portions a44, a53, b44, and b53 of the segment coils A4, A5, B4, and B5 are welded together.

In this manner, four weld end portions constitute each of the conductor joint portions W12, . . . so that the number of the conductor joint portions W12, . . . as welding locations can be decreased to achieve size reduction of a coil end Ce1 including the conductor joint portions W12, . . . . As illustrated in FIG. 5, to obtain an insulation distance between the conductor joint portions 52, the coil end Ce1 is apt to be enlarged outward (in a direction indicated with a narrow β) in the radial direction when the number of the conductor joint portions 52 increases. However, the number of the conductor joint portions 52 is decreased to prevent the coil end Ce1 from being enlarged outward in the radial direction. Moreover, because the number of welding locations can be decreased to reduce manufacturing costs of the stator 10.

The conductor joint portion W12 will be taken as an example. As illustrated in FIG. 11, the coil sides a12 and b12 of the segment coils A1 and B1 that constitute the parallel coil P1 are disposed side by side in the slot S43, and the coil sides a21 and b21 of the segment coils A2 and B2 that constitute the parallel coil P2 are disposed side by side in the slot S1. Thus, when the parallel coil P1 is formed of the segment coils A1 and B1, the weld end portions a14 and b14 are simply bent in the circumferential direction of the stator core 15 so that the weld end portions a14 and b14 can be easily superposed on each other. When the parallel coil P2 is formed of the segment coils A2 and B2, the weld end portions a23 and b23 are simply bent in the circumferential direction of the stator core 15 so that the weld end portions a23 and b23 can be easily superposed on each other. In this manner, the weld end portions a14, b14, a23, and b23 can be bent in the circumferential directions, and easily superposed on one another and welded so that the individual weld end portions a14, b14, a23, and b23 can be prevented from being complicatedly superposed on one another, thereby achieving size reduction of the coil end Ce1.

Further description will be given with the conductor joint portion W12 as an example. The coil sides a12 and b12 of the segment coils A1 and B1 that constitute the parallel coil P1 are held at the first position and the second position in the slot S43. The coil sides a21 and b21 of the segment coils A2 and B2 that constitute the parallel coil P2 are held at the third position and the fourth position in the slot S1. Thus, the coil sides a12 and b12 are displaced from the coil sides a21 and b21 in the radial direction so that the weld end portions a14, b14, a23, and b23 can be easily superposed on one another and connected. In this manner, even when the parallel coils P1 and P2 are connected to each other in series, the weld end portions a14, b14, a23, and b23 can be easily superposed on one another so that the individual weld end portions a14, b14, a23, and b23 can be prevented from being complicatedly superposed on one another, thereby achieving size reduction of the coil end Ce1.

Diameters of Coil Ends

Figure 15:
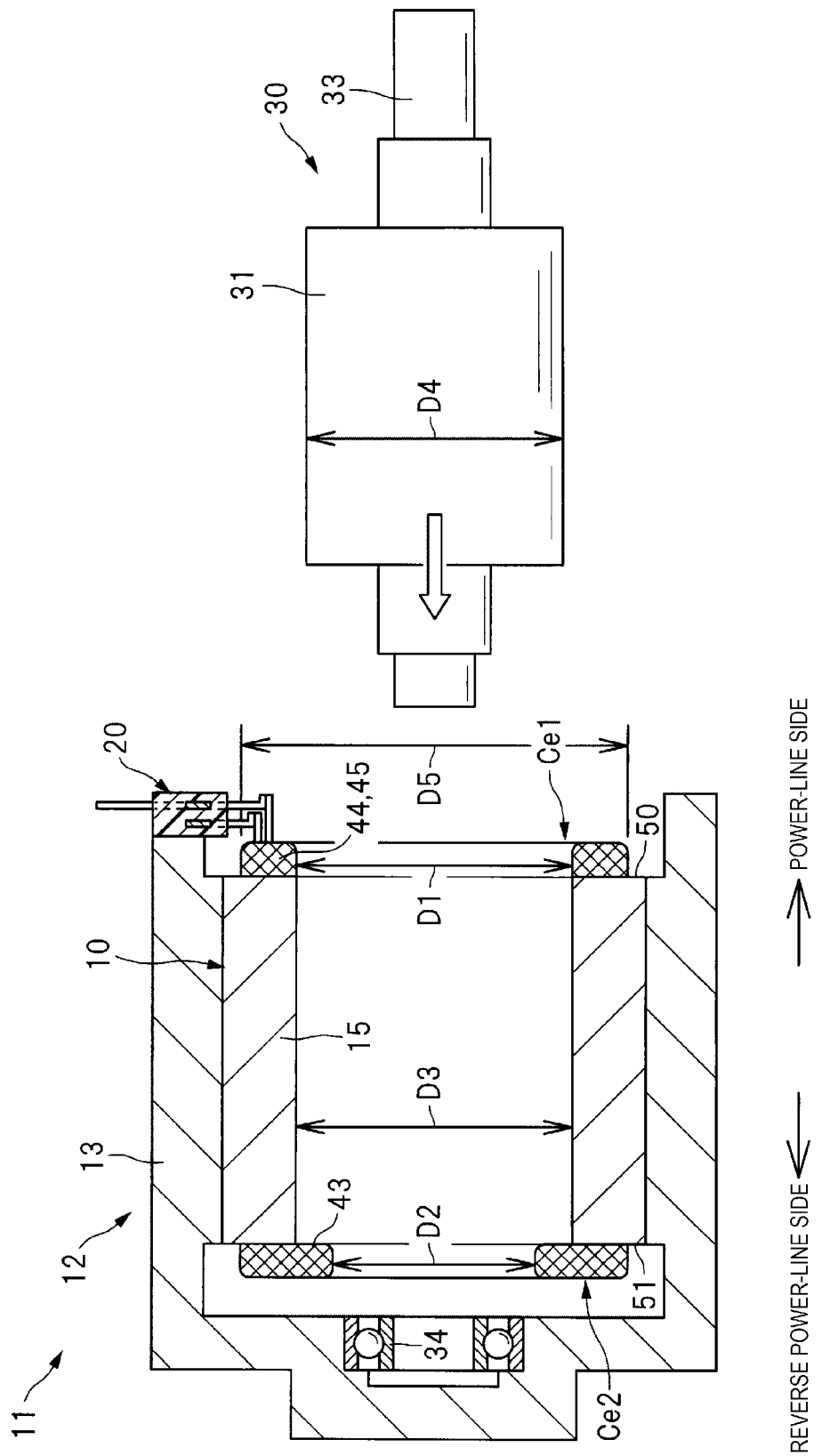
FIG. 15 is a diagram illustrating an assembling process of the stator core and a rotor.

FIG. 15 is a diagram illustrating an assembling process of the stator core 15 and the rotor 30. As illustrated in FIG. 15, the stator coil SC assembled in the stator core 15 includes the coil end Ce1 consisting of the plural weld end portions 44 and 45 that protrude from the one end surface 50 of the stator core 15, and a coil end Ce2 consisting of the plural end portions 43 that protrude from the other end surface 51 of the stator core 15. An inner diameter D2 of the coil end Ce2 on the reverse power-line side is smaller than an inner diameter D1 of the coil end Ce1 on the power-line side. The inner diameter D2 of the coil end Ce2 is smaller than an inner diameter D3 of the stator core 15. The inner diameter D2 of the coil end Ce2 is smaller than an outer diameter D4 of the rotor 30. It is noted that the inner diameter D1 of the coil end Ce1 is larger than the outer diameter D4 of the rotor 30.

As illustrated in FIGS. 10 and 11, on the reverse power-line side where the coil end Ce2 is disposed, the numbers of the segment coils A1 to A32 and B1 to B32 that extend over pairs of the slots are irregular. Meanwhile, on the power-line side where the coil end Ce1 is disposed, the numbers of the segment coils A1 to A32 and B1 to B32 that extend over pairs of the slots are uniform. That is, on the reverse power-line side where the coil end Ce2 is disposed, arrangement of the segment coils A1 to A32 and B1 to B32 is apt to be so complicated that a volume of the coil end Ce2 is likely to be large. Meanwhile, on the power-line side where the coil end Ce1 is disposed, arrangement of the segment coils A1 to A32 and B1 to B32 can be simplified to decrease a volume of the coil end Ce1.

In view of this, as illustrated in FIG. 15, while the coil end Ce2 is allowed to be enlarged inward in the radial direction of the stator core 15, the volume of the coil end Ce1 is decreased to shorten an outer diameter D5 of the coil end Ce1. Since this makes it possible to prevent the coil end Ce1 from being enlarged outward in the radial direction, an insulation distance from the housing body 13 can be easily obtained. That is, because the housing body 13 can be reduced in size, a build of the rotary electric machine 11 can be reduced in size. Even when the coil end Ce2 is enlarged in response to volume reduction of the coil end Ce1, the coil end Ce2 is enlarged inward in the radial direction to keep the build of the rotary electric machine 11 small. Even when the coil end Ce2 is enlarged inward in the radial direction to make the inner diameter D2 of the coil end Ce2 smaller than the inner diameter D3 of the stator core 15 and than the outer diameter D4 of the rotor 30, the rotor 30 is inserted in the stator core 15 from the coil end Ce1 side as indicated with an outlined arrow in FIG. 15 so as to appropriately assemble the rotary electric machine 11.

Other Embodiments

In the foregoing description, two segment coils constitute each parallel coil. However, this is not to be construed in a limiting sense. Three or more segment coils may constitute each parallel coil. FIG. 16A is a simplified partial view of a stator 100 as a second example, illustrating induction voltages generated in a parallel coil P100. FIG. 16B is a simplified partial view of a stator 100x as a second comparative example, illustrating induction voltages generated in a parallel coil P100x. It is noted that FIG. 16A illustrates the single parallel coil P100 among plural parallel coils connected to each other in series.

As illustrated in FIG. 16A, the parallel coil P100 as the second example includes three segment coils A100, B100, and C100 connected to one another in parallel. That is, the parallel coil P100 consists of the segment coil A100, the segment coil B100, and the segment coil C100. In one embodiment, the parallel coil P100 may serve as a "parallel conductor", the segment coil A100 may serve as a "segment conductor" and a "first segment conductor", the segment coil B100 may serve as a "segment conductor" and a "second segment conductor", and the segment coil C100 may serve as a "segment conductor" and a "third segment conductor". The segment coils A100 includes two coil sides a110 and a120, the segment coil B100 includes two coil sides b110 and b120, and the segment coil C100 includes two coil sides c110 and c120.

Here, the parallel coil P100 is regarded as a reference parallel coil, and the segment coils A100, B100, and C100 that constitute the parallel coil P100 are regarded as reference segment coils. In one embodiment, the parallel coil P100 may serve as a "reference parallel conductor", and the segment coils A100, B100, and C100 may serve as "reference segment conductors". In this case, the segment coil A100 includes the coil side a110 that is held in the slot S1 and constitutes a coil group G110, and the coil side a120 that is held in the slot S43 and constitutes a coil group G120. In one embodiment, the coil side a110 may serve as a "first conductor portion", the coil group G110 may serve as a "first conductor portion group", the coil side a120 may serve as a "second conductor portion", and the coil group G120 may serve as a "second conductor portion group".

The segment coil B100 includes the coil side b110 that is held in the slot S1 and constitutes the coil group G110, and the coil side b120 that is held in the slot S43 and constitutes the coil group G120. In one embodiment, the coil side b110 may serve as a "first conductor portion", and the coil side b120 may serve as a "second conductor portion". The segment coil C100 includes the coil side c110 that is held in the slot S1 and constitutes the coil group G110, and the coil side c120 that is held in the slot S43 and constitutes the coil group G120. In one embodiment, the coil side c110 may serve as a "first conductor portion", and the coil side c120 may serve as a "second conductor portion". The coil sides a110, b110, and c110 that constitute the coil group G110 are disposed side by side, and the coil sides a120, b120, and c120 that constitute the coil group G120 are disposed side by side.

As illustrated in FIG. 16A, the three segment coils A100, B100, and C100 that constitute the parallel coil P100 are attached to the stator core 15 while crossing one another. That is, in the coil group G110 in the slot S1, the coil side a110, the coil side b110, and the coil side c110 are disposed in this order from an outer side to an inner side in the radial direction. Meanwhile, in the coil group G120 in the slot S43, the coil side c120, the coil side b120, and the coil side a120 are disposed in this order from an outer side to an inner side in the radial direction. That is, the orders of placement of the segment coils A100, B100, and C100 in the radial direction in the coil group G110 and the coil group G120 are reverse to each other.

In one example, the segment coil A100 that constitutes the parallel coil P100 includes the coil side a110, as the first conductor portion, located at an outermost position in the radial direction in the coil group G110, and the coil side a120, as the second conductor portion, located at an innermost position in the radial direction in the coil group G120. In one embodiment, the coil side a110 may serve as an "outer conductor portion", and the coil side a120 may serve as an "inner conductor portion". The segment coil C100 that constitutes the parallel coil P100 includes the coil side c110, as the first conductor portion, located at an innermost position in the radial direction in the coil group G110, and the coil side c120, as the second conductor portion, located at an outermost position in the radial direction in the coil group G120. In one embodiment, the coil side c110 may serve as an "inner conductor portion", and the coil side c120 may serve as an "outer conductor portion".

In other words, the coil side a110 of the segment coil A100 is located on an outer side of the coil sides b110 and c110 of the segment coils B100 and C100 in the radial direction whereas the coil side a120 of the segment coil A100 is located on an inner side of the coil sides b120 and c120 of the segment coils B100 and C100 in the radial direction. The coil side b110 of the segment coil B100 is located on an outer side of the coil side c110 of the segment coil C100 in the radial direction whereas the coil side b120 of the segment coil B100 is located on an inner side of the coil side c120 of the segment coil C100 in the radial direction.

As indicated with reference symbols α1, β1, and γ1 in FIG. 16A, in the coil group G110 in the slot S1, the coil side b110 is closer to the rotor 30 than the coil side a110 is to the rotor 30, and the coil side c110 is closer to the rotor 30 than the coil side b110 is to the rotor 30. Consequently, an induction voltage of the coil side b110 and its vicinity is higher than an induction voltage of the coil side a110 and its vicinity, and an induction voltage of the coil side c110 and its vicinity is higher than an induction voltage of the coil side b110 and its vicinity. As indicated with reference symbols α2, β2, and γ2, in the coil group G120 in the slot S43, the coil side b120 is closer to the rotor 30 than the coil side c120 is to the rotor 30, and the coil side a120 is closer to the rotor 30 than the coil side b120 is to the rotor 30. Consequently, an induction voltage of the coil side b120 and its vicinity is higher than an induction voltage of the coil side c120 and its vicinity, and an induction voltage of the coil side a120 and its vicinity is higher than an induction voltage of the coil side b120 and its vicinity.

In this manner, the orders of placement of the segment coils A100, B100, and C100 in the coil group G110 and the coil group G120 are reverse to each other so that an induction voltage Va generated in the segment coil A100, an induction voltage Vb generated in the segment coil B100, and an induction voltage Vc generated in the segment coil C100 can be made substantially equal to one another. That is, in the stator 100 of the second example, the segment coils A100, B100, and C100 are less likely to have a potential difference so that a circulating current that flows among the segment coils A100, B100, and C100 can be eliminated or reduced to enhance energy efficiency of the rotary electric machine.

In contrast, as illustrated in FIG. 16B, segment coils A100x, B100x, and C100x of the parallel coil P100x as the second comparative example are attached to the stator core 15 and are parallel to each other. That is, coil sides a110x and a120x of the segment coil A100x are located on an outer side of coil sides b110x and b120x of the segment coil B100x in the radial direction. The coil sides b110x and b120x of the segment coil B100x are located on an outer side of coil sides c110x and c120x of the segment coil C100x in the radial direction.

In other words, as indicated with reference symbols αx, βx, and γx, the segment coil A100x is farther from the rotor 30 than the segment coil B100x is from the rotor 30, and the segment coil B100x is farther from the rotor 30 than the segment coil C100x is from the rotor 30. Consequently, an induction voltage Vax of the segment coil A100x is lower than an induction voltage Vbx of the segment coil B100x, and the induction voltage Vbx of the segment coil B100x is lower than an induction voltage Vcx of the segment coil C100x. That is, the induction voltage Vax generated in the segment coil A100x, the induction voltage Vbx generated in the segment coil B100x, and the induction voltage Vcx generated in the segment coil C100x are different from one another. In this manner, in the stator 100x of the second comparative example, the segment coils A100x, B100x, and C100x have a potential difference so that a circulating current ix is generated among the segment coils A100x, B100x, and C100x, thus lowering energy efficiency of the rotary electric machine.

Needless to say, the disclosure is not limited to the foregoing embodiments, and various modifications can be made thereto within the scope that does not depart from the gist thereof. In the description above, two or three segment coils constitute each parallel coil. However, this is not to be construed in a limiting sense. Four or more segment coils may be connected in parallel to constitute each parallel coil. In the description above, the stator core 15 where the number of the slots is 48 is used. However, this is not to be construed in a limiting sense. A stator core with another number of the slots may be used.

According to the embodiments of the disclosure, one of the plural reference segment conductors includes the outer conductor portion located at the outermost position in the radial direction in the first conductor portion group, and the inner conductor portion located at the innermost position in the radial direction in the second conductor portion group. This can reduce a potential difference between the reference segment conductors so as to eliminate or reduce a circulating current in the stator winding.

The invention claimed is:

1. A stator for a rotary electric machine, the stator comprising:
    a stator core having a hollow cylindrical shape, the stator core including slots; and
    a stator winding comprising a phase winding, the phase winding comprising segment conductors inserted in the slots, wherein
    the phase winding comprises parallel conductors connected to one another in series,
    each of the parallel conductors comprises ones of the segment conductors connected to one another in parallel,
    when one of the parallel conductors is regarded as a reference parallel conductor, and when the segment conductors that constitute the reference parallel conductor are regarded as reference segment conductors, the reference segment conductors comprise
        respective first conductor portions each of which is held in a first slot of the slots, the respective first conductor portions constituting a first conductor portion group, and
        respective second conductor portions each of which is held in a second slot of the slots, the respective second conductor portions constituting a second conductor portion group, and
    one of the reference segment conductors comprises
        an outer conductor portion, as a corresponding one of the respective first conductor portions, located on an outermost position in a radial direction in the first conductor portion group, and
        an inner conductor portion, as a corresponding one of the respective second conductor portions, located on an innermost position in the radial direction in the second conductor portion group.

2. The stator according to claim 1, wherein
    another of the reference segment conductors comprises
        an inner conductor portion, as the corresponding one of the respective first conductor portions, located on the innermost position in the radial direction in the first conductor portion group, and
        an outer conductor portion, as the corresponding one of the respective second conductor portions, located on the outermost position in the radial direction in the second conductor portion group.

3. The stator according to claim 2, wherein
    the respective first conductor portions are disposed side by side, and
    the respective second conductor portions are disposed side by side.

4. The stator according to claim 3, wherein
    the reference segment conductors comprise a first segment conductor and a second segment conductor that are connected to each other in parallel,
    the first conductor portion of the first segment conductor is located on an outer side of the first conductor portion of the second segment conductor in the radial direction, and
    the second conductor portion of the first segment conductor is located on an inner side of the second conductor portion of the second segment conductor in the radial direction.

5. The stator according to claim 3, wherein
the conductors comprise a first segment conductor, a second segment conductor, and a third segment conductor that are connected to one another in parallel,
the corresponding one of the respective first conductor portions of the first segment conductor is located on an outer side of the first conductor portions of the second segment conductor and the third segment conductor in the radial direction,
the corresponding one of the respective second conductor portions of the first segment conductor is located on an inner side of the second conductor portions of the second segment conductor and the third segment conductor in the radial direction,
the corresponding one of the respective first conductor portions of the second segment conductor is located on an outer side of the first conductor portion of the third segment conductor in the radial direction, and
the corresponding one of the respective second conductor portions of the second segment conductor is located on an inner side of the second conductor portion of the third segment conductor in the radial direction.

6. The stator according to claim 2, wherein
the reference segment conductors comprise a first segment conductor and a second segment conductor that are connected to each other in parallel,
the first conductor portion of the first segment conductor is located on an outer side of the first conductor portion of the second segment conductor in the radial direction, and
the second conductor portion of the first segment conductor is located on an inner side of the second conductor portion of the second segment conductor in the radial direction.

7. The stator according to claim 2, wherein
the conductors comprise a first segment conductor, a second segment conductor, and a third segment conductor that are connected to one another in parallel,
the corresponding one of the respective first conductor portions of the first segment conductor is located on an outer side of the first conductor portions of the second segment conductor and the third segment conductor in the radial direction,
the corresponding one of the respective second conductor portions of the first segment conductor is located on an inner side of the second conductor portions of the second segment conductor and the third segment conductor in the radial direction,
the corresponding one of the respective first conductor portions of the second segment conductor is located on an outer side of the first conductor portion of the third segment conductor in the radial direction, and
the corresponding one of the respective second conductor portions of the second segment conductor is located on an inner side of the second conductor portion of the third segment conductor in the radial direction.

8. The stator according to claim 1, wherein
the respective first conductor portions are disposed side by side, and
the respective second conductor portions are disposed side by side.

9. The stator according to claim 8, wherein
the reference segment conductors comprise a first segment conductor and a second segment conductor that are connected to each other in parallel,
the first conductor portion of the first segment conductor is located on an outer side of the first conductor portion of the second segment conductor in the radial direction, and
the second conductor portion of the first segment conductor is located on an inner side of the second conductor portion of the second segment conductor in the radial direction.

10. The stator according to claim 8, wherein
the conductors comprise a first segment conductor, a second segment conductor, and a third segment conductor that are connected to one another in parallel,
the corresponding one of the respective first conductor portions of the first segment conductor is located on an outer side of the first conductor portions of the second segment conductor and the third segment conductor in the radial direction,
the corresponding one of the respective second conductor portions of the first segment conductor is located on an inner side of the second conductor portions of the second segment conductor and the third segment conductor in the radial direction,
the corresponding one of the respective first conductor portions of the second segment conductor is located on an outer side of the first conductor portion of the third segment conductor in the radial direction, and
the corresponding one of the respective second conductor portions of the second segment conductor is located on an inner side of the second conductor portion of the third segment conductor in the radial direction.

11. The stator according to claim 1, wherein
the reference segment conductors comprise a first segment conductor and a second segment conductor that are connected to each other in parallel,
the first conductor portion of the first segment conductor is located on an outer side of the first conductor portion of the second segment conductor in the radial direction, and
the second conductor portion of the first segment conductor is located on an inner side of the second conductor portion of the second segment conductor in the radial direction.

12. The stator according to claim 1, wherein
the conductors comprise a first segment conductor, a second segment conductor, and a third segment conductor that are connected to one another in parallel,
the corresponding one of the respective first conductor portions of the first segment conductor is located on an outer side of the first conductor portions of the second segment conductor and the third segment conductor in the radial direction,
the corresponding one of the respective second conductor portions of the first segment conductor is located on an inner side of the second conductor portions of the second segment conductor and the third segment conductor in the radial direction,
the corresponding one of the respective first conductor portions of the second segment conductor is located on an outer side of the first conductor portion of the third segment conductor in the radial direction, and
the corresponding one of the respective second conductor portions of the second segment conductor is located on an inner side of the second conductor portion of the third segment conductor in the radial direction.

* * * * *